US011751193B2

(12) United States Patent
Takeda et al.

(10) Patent No.: US 11,751,193 B2
(45) Date of Patent: Sep. 5, 2023

(54) SCHEDULING ORDER FOR A SCHEDULED CELL HAVING DOWNLINK CONTROL INFORMATION FROM MULTIPLE SCHEDULING CELLS

(71) Applicant: QUALCOMM Incorporated, San Diego, CA (US)

(72) Inventors: Kazuki Takeda, Tokyo (JP); Alberto Rico Alvarino, San Diego, CA (US); Peter Gaal, San Diego, CA (US); Mostafa Khoshnevisan, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/149,630

(22) Filed: Jan. 14, 2021

(65) Prior Publication Data
US 2022/0225356 A1 Jul. 14, 2022

(51) Int. Cl.
*H04W 72/12* (2023.01)
*H04W 72/1263* (2023.01)
*H04W 72/23* (2023.01)

(52) U.S. Cl.
CPC ....... *H04W 72/1263* (2013.01); *H04W 72/23* (2023.01)

(58) Field of Classification Search
None
See application file for complete search history.

(56) References Cited

U.S. PATENT DOCUMENTS

| 2017/0048846 | A1* | 2/2017 | Yang | H04L 1/1861 |
| 2019/0363843 | A1 | 11/2019 | Gordaychik | |
| 2020/0053748 | A1* | 2/2020 | Hosseini | H04L 1/1854 |
| 2020/0296701 | A1* | 9/2020 | Park | H04L 1/1896 |

(Continued)

FOREIGN PATENT DOCUMENTS

| WO | WO-2020204528 A1 | 10/2020 |
| WO | WO-2020232079 A1 | 11/2020 |

OTHER PUBLICATIONS

International Search Report and Written Opinion—PCT/US2021/064404—ISA/EPO—dated Apr. 29, 2022 (2101664WO).

*Primary Examiner* — Kodzovi Acolatse
(74) *Attorney, Agent, or Firm* — Holland & Hart LLP

(57) ABSTRACT

Methods, systems, and devices for wireless communication are described. In one example, a method for wireless communication at a user equipment (UE) includes identifying that the UE is in carrier aggregation communication with a first cell having a first sub-carrier spacing and a second cell having a second, different sub-carrier spacing. The method may further include monitoring one or more UE-specific search spaces of the first cell for first control information scheduling a first data communication on the first cell and one or more UE-specific search spaces of the first cell or the second cell for second control information scheduling a second data communication on the first cell, and resolving a scheduling order of the first control information scheduling the first data communication and the second control information scheduling the second data communication based at least in part on the monitoring and on a scheduling condition.

30 Claims, 14 Drawing Sheets

(56) References Cited

U.S. PATENT DOCUMENTS

| | | | | |
|---|---|---|---|---|
| 2020/0314747 A1* | 10/2020 | Zhou | .................... | H04W 76/28 |
| 2020/0351921 A1* | 11/2020 | Xu | ........................ | H04L 5/0094 |
| 2021/0136759 A1* | 5/2021 | Ji | ........................ | H04L 5/0044 |
| 2021/0144746 A1* | 5/2021 | Ji | ........................ | H04L 5/0053 |
| 2021/0204286 A1* | 7/2021 | Yang | ....................... | H04L 1/16 |
| 2022/0029758 A1* | 1/2022 | Bae | ....................... | H04W 72/14 |
| 2022/0030615 A1* | 1/2022 | Saber | ................... | H04W 72/044 |
| 2022/0272650 A1* | 8/2022 | Ko | ........................ | H04W 76/28 |
| 2022/0303064 A1* | 9/2022 | Yang | .................... | H04L 1/1896 |
| 2022/0303100 A1* | 9/2022 | Yang | .................... | H04L 1/1671 |
| 2022/0304027 A1* | 9/2022 | Yang | .................. | H04W 72/121 |
| 2022/0322118 A1* | 10/2022 | Kim | ................... | H04W 72/042 |
| 2022/0377776 A1* | 11/2022 | Choi | ................. | H04W 72/1284 |
| 2022/0377777 A1* | 11/2022 | Choi | .................... | H04L 1/1812 |
| 2022/0377779 A1* | 11/2022 | Ji | ..................... | H04W 72/1278 |

* cited by examiner

SCHEDULING ORDER FOR A SCHEDULED CELL HAVING DOWNLINK CONTROL INFORMATION FROM MULTIPLE SCHEDULING CELLS

FIELD OF TECHNOLOGY

The following relates to wireless communication, including a scheduling order for a scheduled cell having downlink control information from multiple scheduling cells.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support a scheduling order for a scheduled cell having downlink control information from multiple scheduling cells. Generally, the described techniques relate to resolving a scheduling order (e.g., out of order scheduling) for data communications in, for example, cross-carrier aggregation scenarios where the carriers have different sub-carrier spacing. If two or more downlink control informations are received that schedule data communications on a scheduled cell and that conflict with the timing the UE might expect, techniques are provided herein to resolve the scheduling order. The techniques may include the UE enabling the scheduling order and monitoring for the data communications according to the scheduling order, resolving the scheduling order based on a physical timing of a scheduling cell or a scheduled cell, or applying an offset that accounts for the different processing times of the different control information due to the differences in sub-carrier spacing, among other examples.

A method for wireless communication at a UE is described. The method may include identifying that the UE is in carrier aggregation communication with a first cell having a first sub-carrier spacing and a second cell having a second sub-carrier spacing different than the first sub-carrier spacing. The method may further include monitoring one or more UE-specific search spaces of the first cell for first control information scheduling a first data communication on the first cell and one or more UE-specific search spaces of the first cell or the second cell for second control information scheduling a second data communication on the first cell. The method may further include resolving a scheduling order of the first control information scheduling the first data communication and the second control information scheduling the second data communication based on the monitoring and on a scheduling condition.

An apparatus for wireless communication at a UE is described. The apparatus may include a processor, memory in electronic communication with the processor, and instructions stored in the memory. The instructions may be executable by the processor to cause the apparatus to identify that the UE is in carrier aggregation communication with a first cell having a first sub-carrier spacing and a second cell having a second sub-carrier spacing different than the first sub-carrier spacing. The instructions may be executable by the processor to cause the apparatus to monitor one or more UE-specific search spaces of the first cell for first control information scheduling a first data communication on the first cell and one or more UE-specific search spaces of the first cell or the second cell for second control information scheduling a second data communication on the first cell. The instructions may be executable by the processor to cause the apparatus to resolve a scheduling order of the first control information scheduling the first data communication and the second control information scheduling the second data communication based on the monitoring and on a scheduling condition.

Another apparatus for wireless communication at a UE is described. The apparatus may include means for identifying that the UE is in carrier aggregation communication with a first cell having a first sub-carrier spacing and a second cell having a second sub-carrier spacing different than the first sub-carrier spacing. The apparatus may also include means for monitoring one or more UE-specific search spaces of the first cell for first control information scheduling a first data communication on the first cell and one or more UE-specific search spaces of the first cell or the second cell for second control information scheduling a second data communication on the first cell. The apparatus may also include means for resolving a scheduling order of the first control information scheduling the first data communication and the second control information scheduling the second data communication based on the monitoring and on a scheduling condition.

A non-transitory computer-readable medium storing code for wireless communication at a UE is described. The code may include instructions executable by a processor to identify that the UE is in carrier aggregation communication with a first cell having a first sub-carrier spacing and a second cell having a second sub-carrier spacing different than the first sub-carrier spacing. The code may also include executable by a processor to monitor one or more UE-specific search spaces of the first cell for first control information scheduling a first data communication on the first cell and one or more UE-specific search spaces of the first cell or the second cell for second control information scheduling a second data communication on the first cell. The code may also include executable by a processor to resolve a scheduling order of the first control information scheduling the first data communication and the second control information scheduling the second data communication based on the monitoring and on a scheduling condition.

In some examples of the method, apparatuses, and non-transitory computer-readable medium described herein, the scheduling order includes that the first control information ends at a first symbol and schedules a first data communication that starts at a second symbol and ends in a third symbol and that the second control information ends in a fourth symbol and schedules the second data communication to start before the third symbol, and the first symbol precedes the second, third, and fourth symbols.

Some examples of the method, apparatuses, and non-transitory computer-readable medium described herein may further include operations, features, means, or instructions for determining that the scheduling condition indicates that the UE supports scheduling order, determining that the first control information scheduling the first data communication and the second control information scheduling the second data communication may be scheduled by different cells, where resolving the scheduling order further includes, and enabling the scheduling order.

Some examples of the method, apparatuses, and non-transitory computer-readable medium described herein may further include operations, features, means, or instructions for transmitting an indication that the UE supports scheduling order to a base station, where resolving the scheduling order may be further based on transmitting the indication.

Some examples of the method, apparatuses, and non-transitory computer-readable medium described herein may further include operations, features, means, or instructions for receiving a configuration that indicates the UE may be to support scheduling order, where resolving the scheduling order may be further based on receiving the configuration.

Some examples of the method, apparatuses, and non-transitory computer-readable medium described herein may further include operations, features, means, or instructions for determining that the scheduling condition indicates that the UE supports scheduling order, determining that the first control information scheduling the first data communication and the second control information scheduling the second data communication may be scheduled by the first cell, where resolving the scheduling order further includes, and disabling the scheduling order.

Some examples of the method, apparatuses, and non-transitory computer-readable medium described herein may further include operations, features, means, or instructions for determining an ending symbol of the second control information, where the scheduling condition includes the ending symbol of the second control information, and where resolving the scheduling order may be further based on the ending symbol of the second control information.

In some examples of the method, apparatuses, and non-transitory computer-readable medium described herein, the second data communication begins after the ending symbol of the first control information.

In some examples of the method, apparatuses, and non-transitory computer-readable medium described herein, the first cell may be a scheduling cell and the second cell may be a scheduled cell.

In some examples of the method, apparatuses, and non-transitory computer-readable medium described herein, the first cell and the second cell may be scheduling cells.

Some examples of the method, apparatuses, and non-transitory computer-readable medium described herein may further include operations, features, means, or instructions for determining an ending symbol of the first control information, where the scheduling condition may be the ending symbol of the first control information, and resolving the scheduling order may be further based on the ending symbol of the first control information.

Some examples of the method, apparatuses, and non-transitory computer-readable medium described herein may further include operations, features, means, or instructions for determining an offset based on a processing time difference between decoding the first control information and the second control information at the UE, where the scheduling condition includes the offset.

Some examples of the method, apparatuses, and non-transitory computer-readable medium described herein may further include operations, features, means, or instructions for determining an ending symbol of the second control information, where resolving the scheduling order may be further based on the ending symbol of the second control information and the offset.

In some examples of the method, apparatuses, and non-transitory computer-readable medium described herein, the first data communication may be received before an end of the second data communication when the first control information ends at least by the ending symbol of the second control information adjusted with the offset.

Some examples of the method, apparatuses, and non-transitory computer-readable medium described herein may further include operations, features, means, or instructions for determining an ending symbol of the first control information, where resolving the scheduling order may be further based on the ending symbol of the first control information and the offset.

In some examples of the method, apparatuses, and non-transitory computer-readable medium described herein, the second data communication may be received before an end of the first data communication when the second control information ends at least by the ending symbol of the first control information adjusted with the offset.

Some examples of the method, apparatuses, and non-transitory computer-readable medium described herein may further include operations, features, means, or instructions for receiving a configuration that identifies the offset from a base station.

Some examples of the method, apparatuses, and non-transitory computer-readable medium described herein may further include operations, features, means, or instructions for determining the offset based on a difference between the first sub-carrier spacing and the second sub-carrier spacing.

Some examples of the method, apparatuses, and non-transitory computer-readable medium described herein may further include operations, features, means, or instructions for determining the offset based on a number of symbols in the first control information and a number of symbols in the second control information.

Some examples of the method, apparatuses, and non-transitory computer-readable medium described herein may further include operations, features, means, or instructions for decoding the first data communication and the second data communication based on the resolved scheduling order.

In some examples of the method, apparatuses, and non-transitory computer-readable medium described herein, the first cell may be a primary cell and the second cell may be a secondary cell.

Some examples of the method, apparatuses, and non-transitory computer-readable medium described herein may further include operations, features, means, or instructions for transmitting an indication that the UE may be configured for cross-carrier scheduling from the secondary cell to the primary cell to a base station.

Some examples of the method, apparatuses, and non-transitory computer-readable medium described herein may further include operations, features, means, or instructions for monitoring the UE-specific search spaces of the first cell for the first control information or the second control information may be in accordance with a physical downlink control channel monitoring occasion of the first cell.

DETAILED DESCRIPTION

Figure 1:
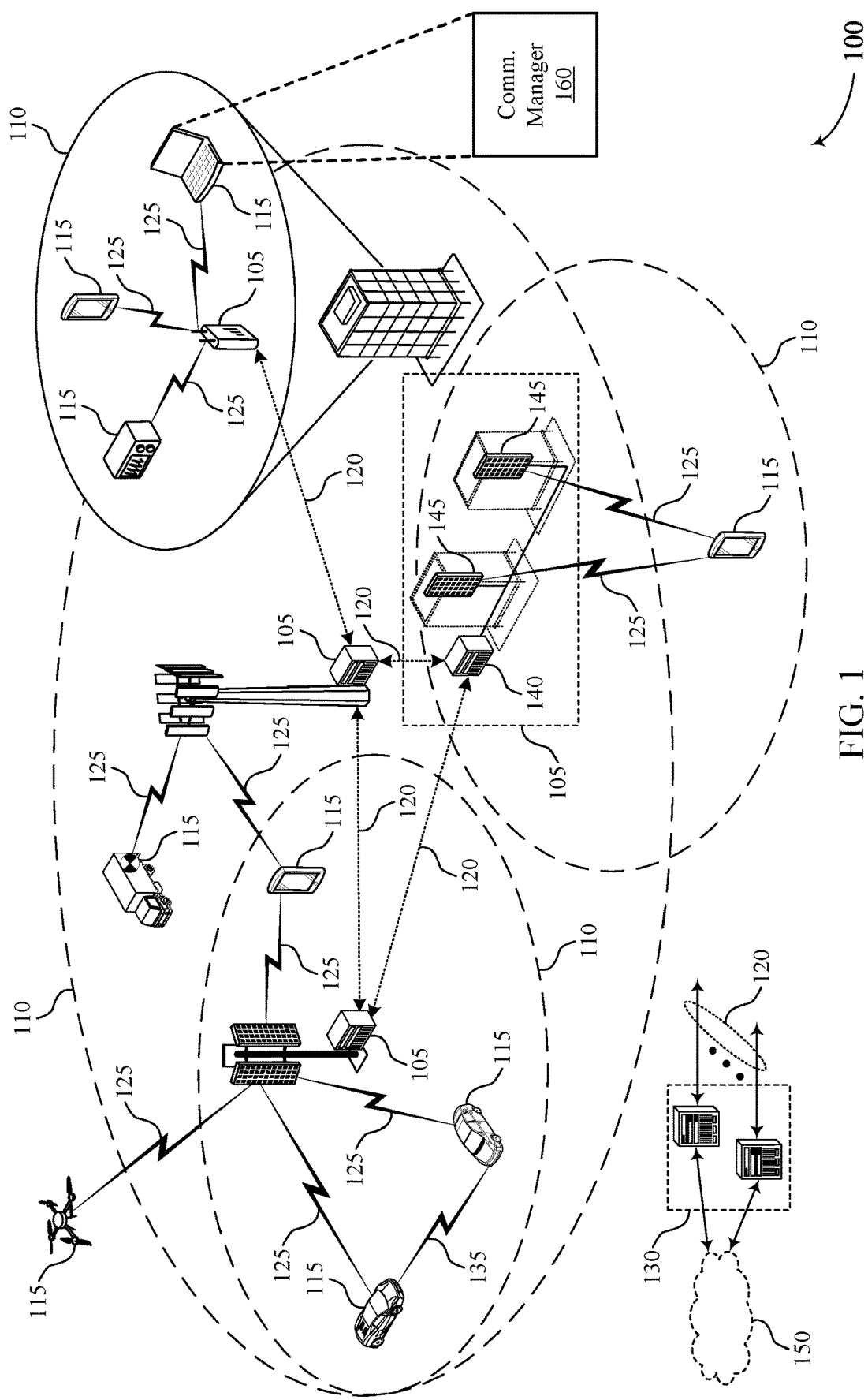
FIG. 1 illustrates an example of a wireless communications system that supports a scheduling order for a scheduled cell having downlink control information from multiple scheduling cells in accordance with aspects of the present disclosure.

In dynamic spectrum sharing (DSS), among other examples, a component carrier in carrier aggregation may be configured to share resources between multiple Radio Access Technologies (RATs), such as NR and LTE. Cross-carrier scheduling may also be enabled, where one carrier contains scheduling information (e.g., data) for another carrier. A carrier may schedule data communications for another carrier using control information on the carrier. For example, control information scheduling a data transmission on a primary cell (which may be referred to as a PCell) may be transmitted to a UE on a secondary cell (which may be referred to as an SCell). In general, this means that a UE that is configured to communicate using carrier aggregation on both a PCell and an SCell may monitor one cell, such as the SCell, for UE-specific search spaces that include downlink control information (DCI) pertaining to the data communication on another cell, such as the PCell. For example, control information (e.g., via a physical downlink control channel (PDCCH)) on the SCell may schedule a data transmission (e.g., via a physical downlink shared channel (PDSCH)) on the PCell. This is a form of cross-carrier scheduling.

A cell that schedules data communications for a cell (either the same cell or another cell) may be referred to as a scheduling cell. A cell that has data communication scheduled for that cell (either by the cell itself or by another cell) may be referred to as a scheduled cell. As used herein, the terms carrier and cell may be used interchangeably.

However, there may be scenarios where there are two cells that are scheduling information (e.g., successfully scheduling or unsuccessfully attempting to schedule) on a single, scheduled cell. For example, in addition to the control information on the SCell that scheduled a data communication for the PCell, the additional data communications may be scheduled on the PCell by the PCell or by another scheduling cell. In this situation, there are two scheduling cells (e.g., the PCell and the SCell), and one scheduled cell (e.g., the PCell). However, the two carriers may use different subcarrier spacing (e.g., 15 kHz and 30 kHz, or 15 kHz and 120 kHz, etc.). This difference in subcarrier spacing may create a situation where the data communications are scheduled out-of-order (OOO) with respect to the control signaling. Under other different rules and procedures, however, a UE may not be configured to process out-of-order communications, such as an out-of-order hybrid automatic repeat request (HARQ) process.

An example scheduling order that may be considered an out-of-order scheduling is as follows. A first control information may end at a first symbol and schedule a first data communication that starts at a second symbol and ends in a third symbol. If the second control information ends in a fourth symbol and schedules a second data communication to start before the third symbol, this may be considered an out-of-order schedule because the second control information schedules the second data communications between the end of the first control information and before the end of the first data communications. Other various examples of scheduling orders are described herein and are contemplated by this disclosure.

Some techniques described herein enable a scheduling order that is out-of-order. For example, the UE may enable out-of-order scheduling support for two HARQ process in a scheduled cell. The techniques may support out-of-order scheduling if two data communications with different HARQ processes in a given scheduled cell are scheduled by DCI formats in different scheduling cells. If the different HARQ processes were scheduled by the same scheduling cell, then out-of-order scheduling would not be supported.

Additional or alternative techniques described herein enable a UE to process a scheduling order that is out-of-order. For example, a UE that uses different sub-carrier spacing between two different cells may be able to compensate for any out-of-order scheduling situations due to the sub-carrier spacing difference for two HARQ processes in a scheduled cell. Some techniques described herein determine the control signaling based on the physical timing of the control signals. The timing of the control information may be relative to the scheduled cell or the scheduling cell, which may eliminate the out-of-order scheduling scenario. This means that the ending symbol for the both sets of control information may be judged based on a symbol index of the scheduled cell, among other examples.

Other techniques described herein that enable a UE to process a scheduling order that is out-of-order add an offset to the timing to account for different processing times at the UE due to the different sub-carrier spacings. A UE may take longer to process, for example, PDCCH on a cell with a longer sub-carrier spacing than on a cell with a shorter sub-carrier spacing. Techniques described herein may modify the expected timing requirements for the PDCCHs or the data communications to account for this processing time difference. The offset may be preconfigured, determined by the base station, or signaled to the base station by the UE.

Aspects of the disclosure are initially described in the context of wireless communications systems. Aspects of the disclosure are further illustrated by and described with reference to block diagrams, a swim diagram, and a flowchart that relate to a scheduling order for a scheduled cell having downlink control information from multiple scheduling cells. Aspects of the disclosure are further illustrated by and described with reference to apparatus diagrams, system diagrams, and flowcharts that relate to a scheduling order for a scheduled cell having downlink control information from multiple scheduling cells.

FIG. 1 illustrates an example of a wireless communications system 100 that supports a scheduling order for a scheduled cell having downlink control information from multiple scheduling cells in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

As described above, there may be a scheduling order for data communications on a scheduled cell that is different from what a UE would expect. The scheduling cell and the scheduled cell may have different sub-carrier spacing that can create an OOO schedule. Techniques described herein provide mechanisms to resolve such a scheduling order.

A UE 115 may include a UE communications manager 160. The UE communications manager 160 may identify that the UE is in carrier aggregation communication with a first cell having a first sub-carrier spacing and a second cell having a second sub-carrier spacing different than the first sub-carrier spacing. The UE communications manager 160 may monitor one or more UE-specific search spaces of the first cell for first control information scheduling a first data communication on the first cell and one or more UE-specific search spaces of the first cell or the second cell for second control information scheduling a second data communication on the first cell. The UE communications manager 160 may also resolve a scheduling order of the first control information scheduling the first data communication and the second control information scheduling the second data communication based at least in part on the monitoring and on a scheduling condition.

The UE communications manager 160 may increase the scope of supported cross-carrier scheduling, reduce latency, improve throughput, improve reliability of communications, reduce retransmissions, and improve power savings at the UE 115.

Figure 2:
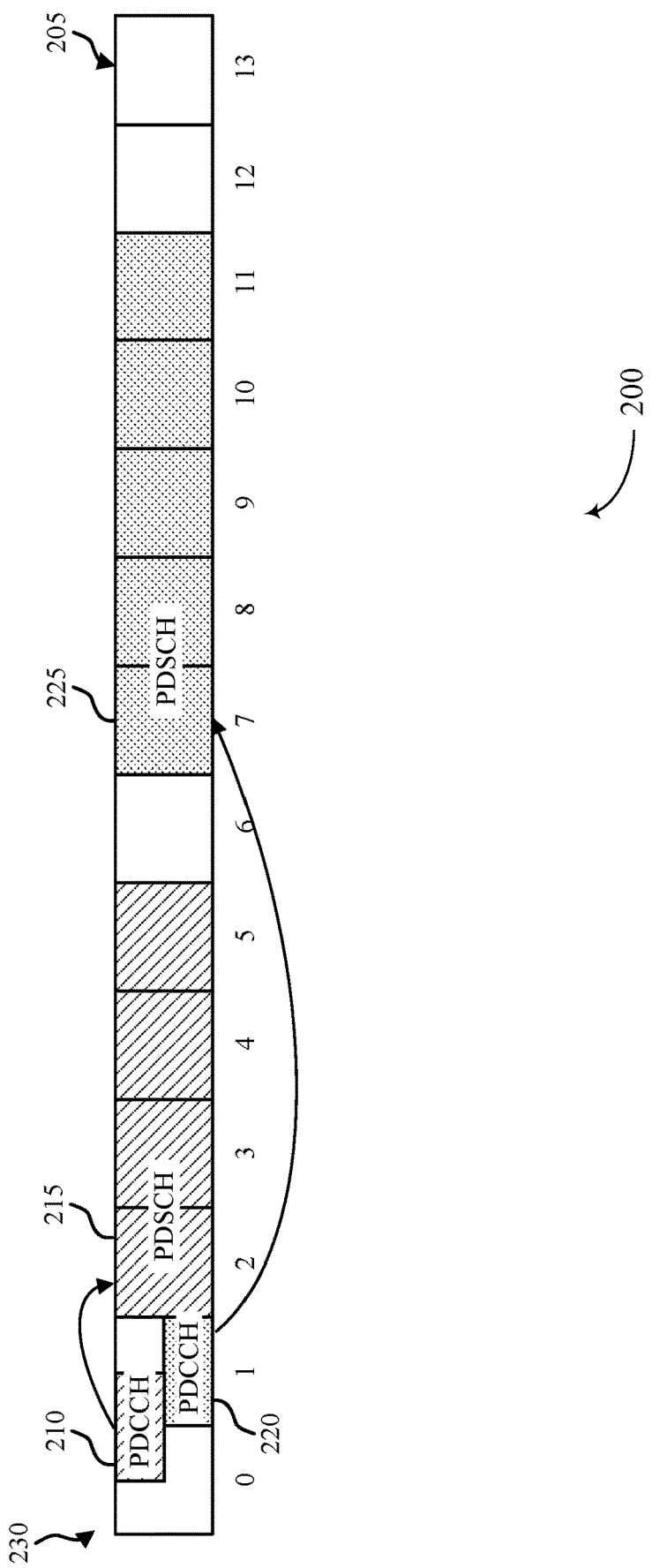
FIGS. 2 through 6 illustrate examples of block diagrams that support a scheduling order for a scheduled cell having downlink control information from multiple scheduling cells in accordance with aspects of the present disclosure.

FIG. 2 illustrates an example of a block diagram 200 that supports a scheduling order for a scheduled cell having downlink control information from multiple scheduling cells in accordance with aspects of the present disclosure. The block diagram 200 may implement various aspects of the wireless communications system 100 or may be implemented by various aspects of the wireless communications system 100, among other examples. The block diagram 200 shows a cell 230 supporting a slot 205, which may be a single slot of a sub-frame of an NR frame. The slot 205 may, in some examples, include a set of fourteen symbols having indexes 0 to 13. The slot 205 may be transmitted from a base station 105 to a UE 115 as described with reference to FIG. 1, for example.

The slot 205 may include a first PDCCH 210 that schedules a first PDSCH 215 and a second PDCCH 220 that schedules a second PDSCH 225. Each PDCCH 210 and 220 may include control information and each PDSCH 215 and 225 may include a data communication. The cell 230 may have a sub-carrier spacing, such as 15 KiloHertz (kHz), 30 kHz, 60 kHz, 120 kHz, 240 kHz, or the like. The cell 230 may, in some examples, be a PCell.

The example of FIG. 2 shows a single cell 230, having the PDCCH 210 that schedules the PDSCH 215 and the PDCCH 220 that schedules the PDSCH 225. The scheduling order shown in FIG. 2 is not an out-of-order scheduling. However, if the PDCCH 220 ends before the PDCCH 210 ends, that may be considered an out-of-order scheduling.

For example, there may be a PDCCH on an SCell that schedules data on the PCell, such as the cell 230. In scenarios without DSS enabled, there may be only one scheduling cell, such as in FIG. 2. For example, if a PCell is scheduling for one SCell, then for that one scheduled SCell, the PDCCH may be monitored only on the PCell. In such an example, there may not be a situation where there is one scheduled cell that is scheduled by more than one scheduling cell. Alternatively, with DSS, cross-carrier scheduling may be enabled from the SCell to the PCell. However, the PCell may need a common search space. Moving the common search space to the SCell may result in errors because the SCell may be unstable, deactivated, or removed (using the search space on an SCell may be more appropriate for a redundancy or broadcast situation).

In techniques described herein, the DSS with cross-carrier scheduling may schedule from the SCell to the PCell (e.g., the DSS carrier), and the UE may monitor the common search space on the PCell or the UE-specific search space on the PCell. However, in some scenarios, there may be two scheduling cells for the DSS carrier (e.g., the PCell). The two scheduling cells may include the PCell itself (at least for the common search space) and the SCell, which may schedule for the PCell. The DCI may be detected either in the PCell itself or in an SCell for cross-carrier scheduling.

Previously, in a given scheduled cell, a UE may not expect to receive a first PDSCH, and a second PDSCH starting later than the first PDSCH, with its corresponding HARQ-ACK assigned to be transmitted on a resource ending before the start of a different resource for the HARQ-ACK assigned to be transmitted for the first PDSCH if the HARQ-ACK for the two PDSCHs are associated with HARQ-ACK codebooks of different priorities. For any two HARQ process identifications (IDs) in a given scheduled cell, if the UE is scheduled to start receiving a first PDSCH starting in symbol j by a PDCCH ending in symbol i, the UE is not expected to be scheduled to receive a PDSCH starting earlier than the end of the first PDSCH with a PDCCH that ends later than symbol i. Techniques described herein may enable the UE to process first and second PDSCHs having this timing scenario.

The UE may process the first PDSCH 215 and the second PDSCH 225 based on techniques described herein. For example, the UE may determine that the scheduling order is allowed and expects to receive the first PDSCH 215 and the second PDSCH 225, adjusts the timing requirements based on the physical timing of either the first PDCCH 210 and the first PDCCH 220, or takes into consideration the processing time for the first PDCCH 210 and the first PDCCH 220.

Figure 3:
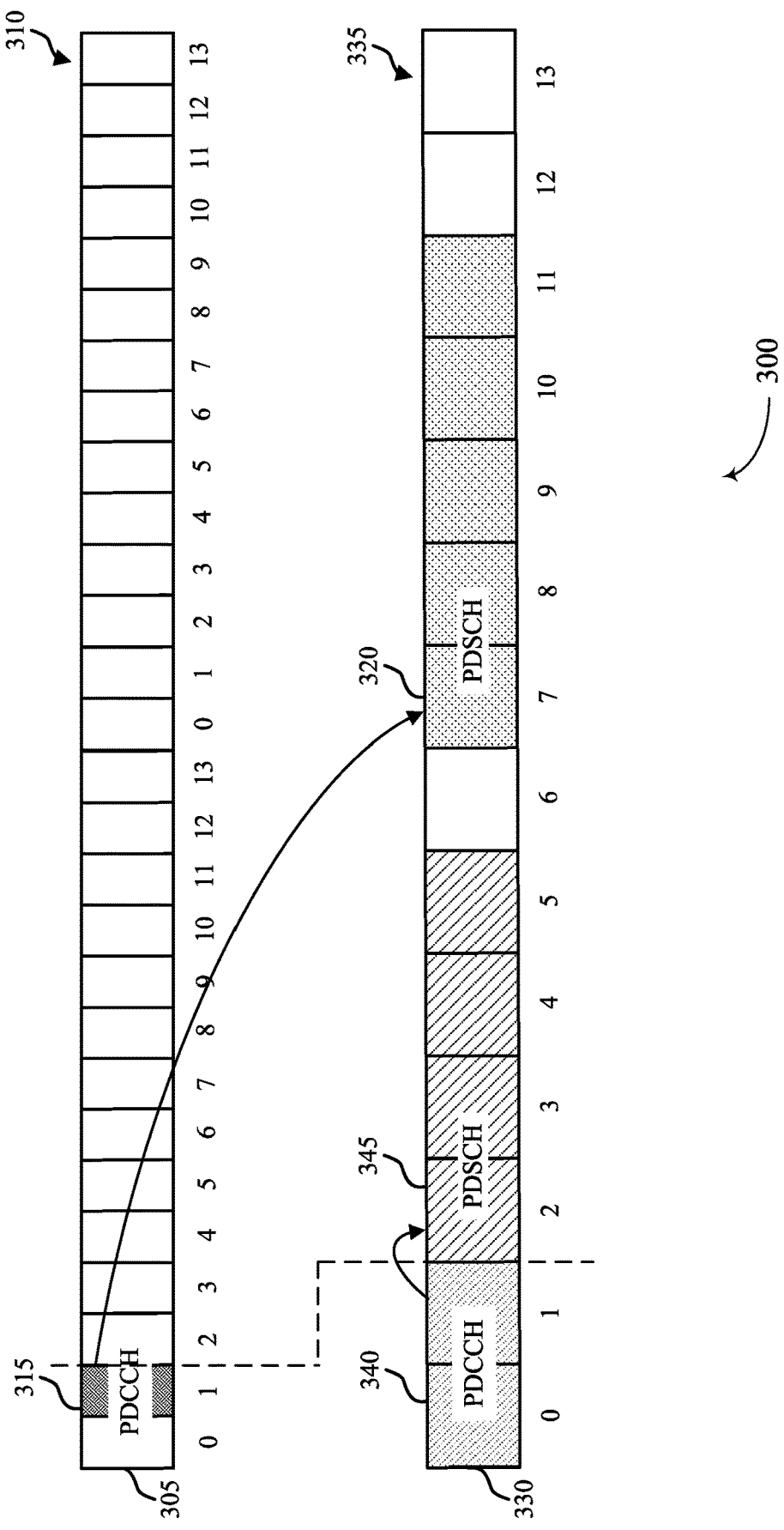

FIG. 3 illustrates an example of a block diagram 300 that supports a scheduling order for a scheduled cell 330 having downlink control information from multiple scheduling cells 305 and 330 in accordance with aspects of the present disclosure. The block diagram 300 may implement various aspects of the wireless communications system 100 or may be implemented by various aspects of the wireless communications system 100, among other examples. The block diagram 300 shows a scheduling cell 305 that has two slots 310, which may be two slots of a sub-frame of an NR frame. The slots 310 may include two slots where each of the slots includes fourteen symbols having indexes 0 to 13. The block diagram 300 also shows a scheduled cell 330 that supports a slot 335, which may be a single slot of fourteen indexes 0 to 13. The cell 305 may be used to communicate between a UE 115 and a base station 105 as described with reference to FIG. 1, for example.

The scheduling cell 305 may have a sub-carrier spacing that is half that of the scheduled cell 330. In other examples, the sub-carrier spacing may be ¼, ⅛, or the like. For example, the sub-carrier spacing of the scheduled cell 330 may be 15 kHz, while the sub-carrier spacing of the scheduling cell 305 may be 30 kHz. In other examples, other sub-carrier spacings may be used.

The scheduling cell 305 may include a first PDCCH 315 that schedules a first PDSCH 320. The scheduled cell 330 may include a second PDCCH 340 that schedules a second PDSCH 345. Each PDCCH 315 and 340 may include control information and each PDSCH 320 and 345 may include a data communication. From a timing point of view, the scheduling of the PDSCH 320 and 345 by the PDCCH 315 and the PDCCH 340 is out-of-order. As described herein, the out-of-order scheduling problem comes from the fact that symbols having the same index in two cells with different sub-carrier spacings are not physically aligned or synchronized. Due to this, UEs and base stations currently allow out-of-order scheduling from a physical timing point of view. Techniques described herein may help the UE to resolve any challenge arising from an out-of-order scheduling.

In some examples, the UE may be configured to support out-of-order scheduling if the two PDCCHs (e.g., DCI) are from different scheduling cells. For any two PDSCHs with different HARQ process IDs in a given scheduled cell scheduled by DCI formats in the same scheduling cell, if the UE is scheduled to start receiving a first PDSCH starting in symbol j by a PDCCH ending in symbol i, the UE is not expected to be scheduled to receive a PDSCH starting earlier than the end of the first PDSCH with a PDCCH that ends later than symbol i. The enabling of out-of-order scheduling may be a scheduling condition that allows the UE to resolve the scheduling order.

The UE may not support out-of-order scheduling if the two PDCCHs are from the same scheduling cell. For any two PDSCHs with different HARQ process IDs in a given scheduled cell scheduled by DCI formats in different scheduling cells, even if the UE is scheduled to start receiving a first PDSCH starting in symbol j by a PDCCH ending in symbol i, the UE is not expected to be scheduled to receive a PDSCH starting earlier than the end of the first PDSCH with a PDCCH that ends later than symbol i. If the UE has out-of-order scheduling enabled but determines that the DCIs are from the same scheduling cell, the UE determines the scheduling to be in error.

Figure 4:
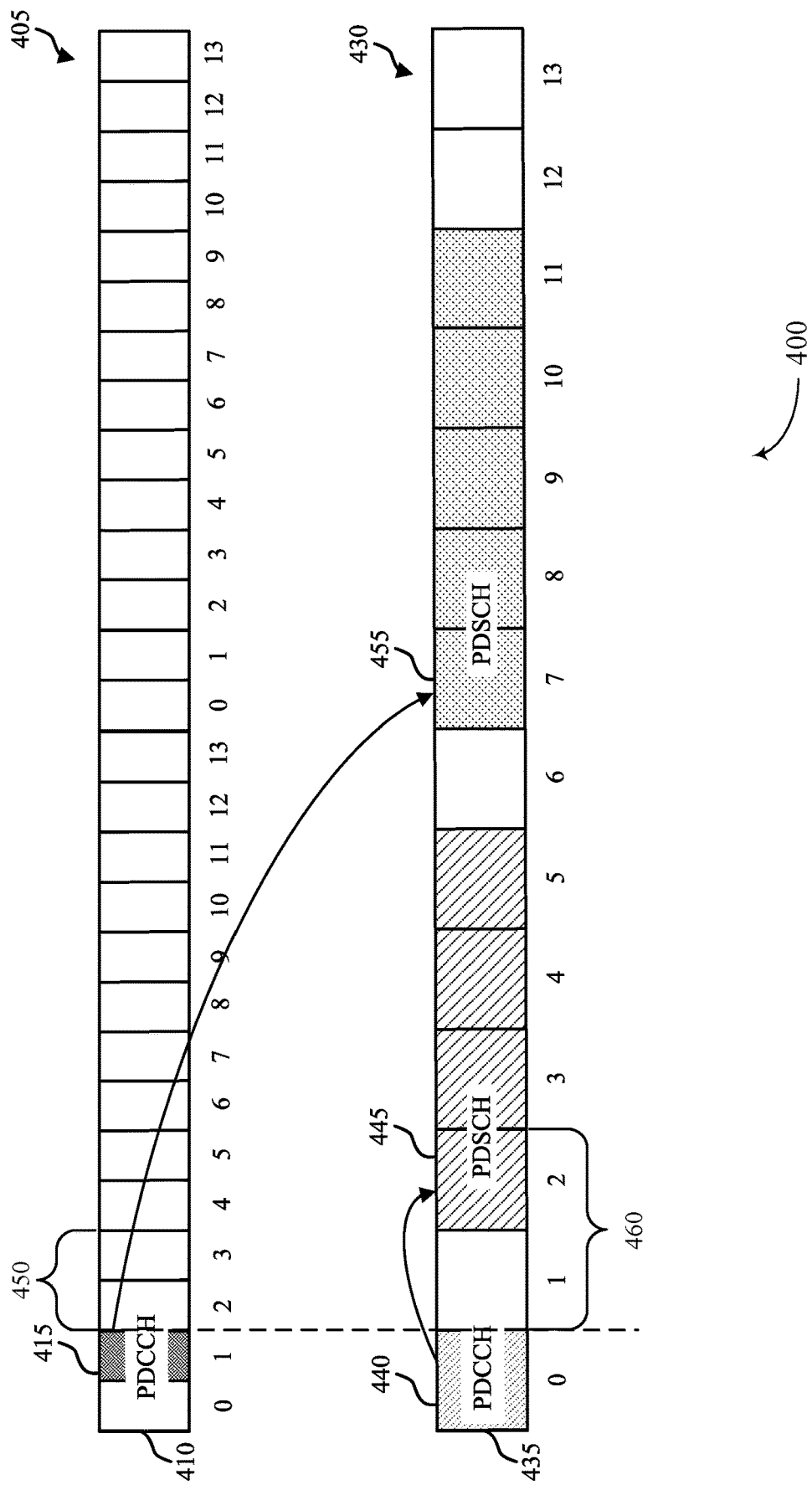

FIG. 4 illustrates an example of a block diagram 400 that supports a scheduling order for a scheduled cell 435 having downlink control information from multiple scheduling cells 435 and 410 in accordance with aspects of the present disclosure. The block diagram 400 may implement various aspects of the wireless communications system 100 or may be implemented by various aspects of the wireless communications system 100, among other examples. The block diagram 400 shows a scheduling cell 410 that supports two slots 405 and a scheduled cell 435 that supports a slot 430. The slots 405 and 430 may be used to communicate between a UE 115 and a base station 105 as described with reference to FIG. 1, for example.

The cells 410 and 435 may have sub-carrier spacing as described in FIG. 3. For example, the cell 410 may support a sub-carrier spacing of 30 kHz and the cell 435 may support a sub-carrier spacing of 15 kHz.

The scheduling cell 410 may include a first PDCCH 415 that schedules a first PDSCH 455. The scheduling cell 435 may include a second PDCCH 440 that schedules a second PDSCH 445. Each PDCCH 415 and 440 may include control information and each PDSCH 455 and 445 may include a data communication. From a timing point of view, the scheduling of the PDSCH 455 and 445 by the PDCCH 415 and the PDCCH 440 is not out-of-order using the techniques described herein.

In one example, the scheduling order may be determined based on the physical timing of the PDCCH 440. For example, if the PDCCH 415 (in the scheduling cell 410 with sub-carrier spacing of 30 kHz) ends in symbol i=0 of the scheduled cell 435, then the PDCCH 440 (in the scheduling cell 435 sub-carrier spacing of 15 kHz) may end in symbol i=0 of the scheduled cell 435 in this example. The physical timing may be based on the scheduled cell 435.

The UE is not expecting to receive the PDSCH 445 with a PDCCH 440 that ends later than the symbol i of the scheduled cell (e.g., 0 in the 15 kHz PCell 435, which corresponds to 1 in the 30 kHz SCell 410). The ending symbol of the PDCCHs 415 and 440 may be judged based on the symbol index of the scheduled cell (e.g., PCell 435). That is, for any two HARQ process IDs in a given scheduled cell, if the UE is scheduled to start receiving a first PDSCH starting in symbol j by a PDCCH ending in symbol i of the scheduled cell, the UE is not expected to be scheduled to receive a PDSCH starting earlier than the end of the first PDSCH with a PDCCH that ends later than symbol i of the scheduled cell.

Applying the timing of the scheduled cell may be a scheduling condition that allows the UE to resolve the scheduling order. This provides one option for compensating for an out-of-order scheduling, but this technique may not take into consideration the time the UE may take to process the PDCCHs 415 and 440. Although the physical ending time of the two PDCCHs 415 and 440 are the same, the UE may process the PDCCH 415 faster than the PDCCH 440 because of the sub-carrier spacing differences (e.g., 30 kHz might process faster than 15 kHz). An alternative technique takes into consideration the actual processing time internal to the UE.

There may be an assumption that the UE will process a PDCCH using the following procedure: Fast Fourier Transform (FFT), then channel estimation, then channel demodulation, then channel decoding, then cycle redundancy check (CRC). These processes may take different amounts of time based at least in part on the sub-carrier spacing. For example, if the UE processes the PDCCH 415 on the SCell 410 with 30 kHz sub-carrier spacing and the PCell carrier 435 with 15 kHz sub-carrier spacing, then the ending time of each of these processes may not be aligned. A processor clock tick on each of the cells 410 and 435 may differ due to the subcarrier spacing difference. For example, the 15 kHz carrier 435 may require two symbols of the 30 kHz cell 410 to process the PDCCH 440, in examples where the number of symbols are the same for the PDCCH 415 and PDCCH 440.

Techniques described herein may consider the processing times for PDCCH 415 and 440 based at least in part on applying an offset, D. The UE can add the number of symbols D to accommodate for an ending time difference of processing the PDCCHs 415 and 440 in examples with different processing timelines for the different PDCCH processing based on the subcarrier spacing. For example, the UE can apply the offset to ensure that the PDCCH processing ending times on the two scheduling cells can be aligned, even if they have different subcarrier spacing. That is, it is possible to specify the value of D such that the PDCCH processing times for different sub-carrier spacings are taken into account.

For any two HARQ process Ills in a given scheduled cell, if the UE is scheduled to start receiving a first PDSCH starting in symbol j by a PDCCH ending in symbol i of the scheduled cell, the UE is not expected to be scheduled to receive a PDSCH starting earlier than the end of the first PDSCH with a PDCCH that ends later than symbol i-I) of the scheduled cell.

For example, it may take the UE a processing time 450 to process the PDCCH 415 in the SCell 410. The processing time 450 may be two symbols of the SCell 410, which means the UE may finish processing the PDCCH 415 by the end of symbol 1 of the PCell carrier 435. Similarly, it may take the UE a processing time 460 to process the PDCCH 440 in the PCell carrier 435, finishing the processing by symbol 2. This would make the scheduling order be OOO. In order to compensate for the processing time, the UE may subtract the offset from the expected end times of the PDCCH.

The processing delay may be based on the combination of the two values of sub-carrier spacings among the two cells. For example, given sub-carrier spacings of 15 kHz and 30 kHz, the value of D may be 2. In another example, given sub-carrier spacings of 15 kHz and 120 kHz, the value of D may be 8. Other examples are considered. Other factors that may affect the value of D may include the number of symbols for the PDCCH, the number of symbols for the CORESET for the PDCCH (more symbols increase processing time), or the type of precoding (e.g., wideband precoding). In some examples, the offset value may be signaled in a demodulation reference signal (DMRS).

In some examples, a network scheduler (e.g., the base station) may determine the offset D based on the processing delays. The base station may inform the UE of the value of the offset D. The possible values of offset D may be determined from a look-up table. In other examples, the UE determines the offset D. The UE may determine the offset D based on a configuration, historical data, or from a look-up table. In some examples, the UE may signal its capabilities (e.g., the value of D) to the base station, and the network may take D into account.

Applying the offset may be a scheduling condition that allows the UE to resolve the scheduling order.

Figure 5:
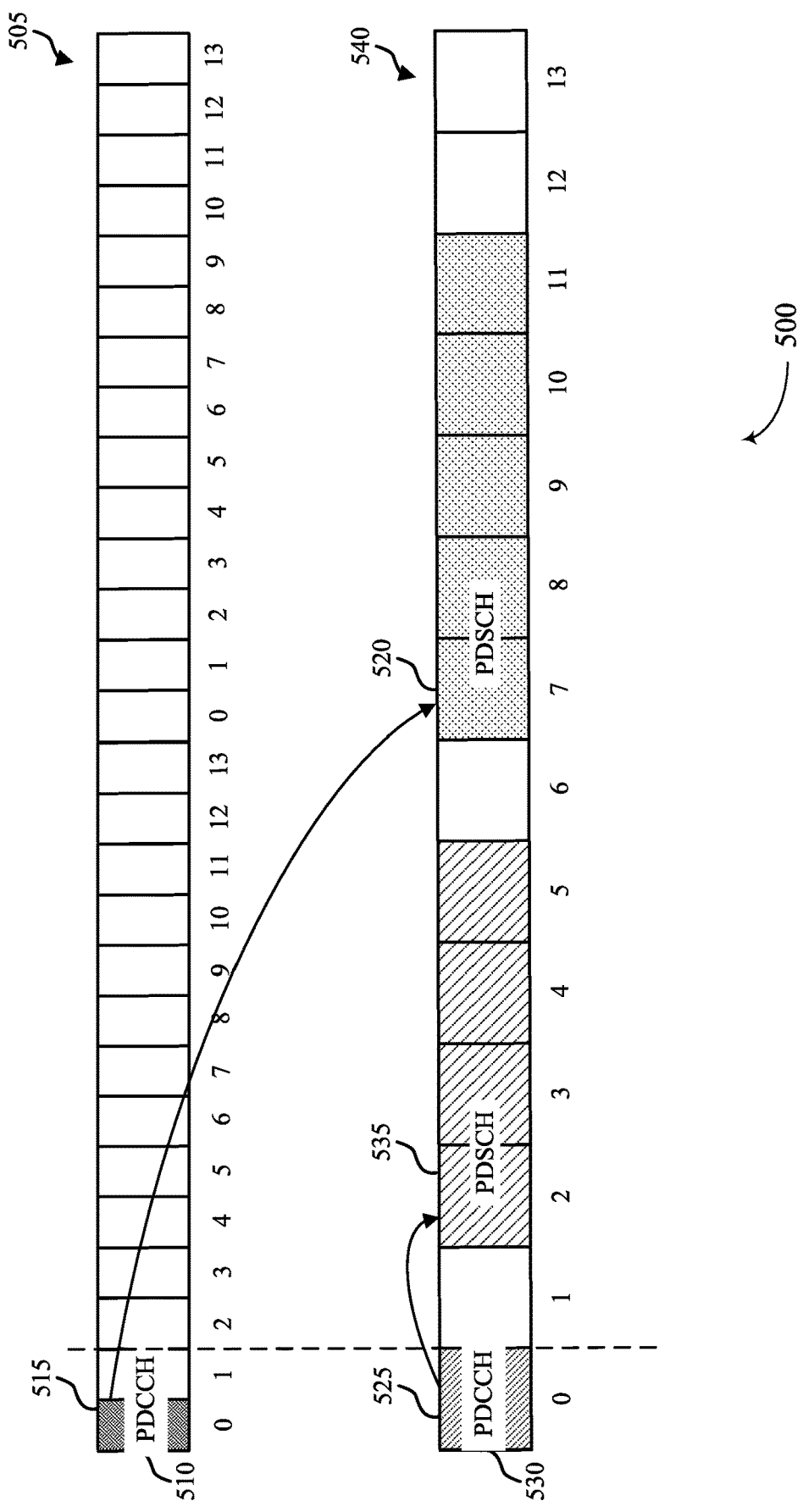

FIG. 5 illustrates an example of a block diagram 500 that supports a scheduling order for a scheduled cell having DCI from multiple scheduling cells in accordance with aspects of the present disclosure. The block diagram 500 may implement various aspects of the wireless communications system 100 or may be implemented by various aspects of the wireless communications system 100, among other examples. The block diagram 500 shows a scheduling cell 510 that supports two slots 505 and a scheduled cell 530 that supports a slot 540. The slots 505 and 540 may be used to communicate between a UE 115 and a base station 105 as described with reference to FIG. 1, for example.

The cells 510 and 530 may have sub-carrier spacing as described in FIG. 3. For example, the cell 510 may support a sub-carrier spacing of 30 kHz and the cell 530 may support a sub-carrier spacing of 15 kHz.

The scheduling cell 510 may include a first PDCCH 515 that schedules a first PDSCH 455. The scheduling cell 530 may include a second PDCCH 535 that schedules a second PDSCH 445. Each PDCCH 515 and 525 may include control information and each PDSCH 520 and 535 may include a data communication. From a timing point of view, the scheduling of the PDSCH 535 and 520 by the PDCCH 515 and the PDCCH 525 is out-of-order. Techniques described herein may help the UE to resolve any challenge arising from this out-of-order scheduling.

In one example, the scheduling order may be determined based on the physical timing of the scheduling cell (e.g., based on the PDCCH 515). For example, if the PDCCH 515 (in the scheduling cell 510 with sub-carrier spacing of 30 kHz) ends in symbol i=0 of the scheduled cell 530, then the PDCCH 535 (in the scheduling cell 530 sub-carrier spacing of 15 kHz) may end in symbol i=0 of the scheduled cell 530 in this example. The physical timing may be based on the scheduling cell 510. For example, if the first PDSCH 520 is scheduled by the first PDCCH 515, then the second PDSCH 535 can be scheduled only before the first PDSCH 520.

The UE is not expecting to receive the PDSCH 535 with a PDCCH 525 that ends later than the symbol i of the scheduling cell (e.g., 1 in the 30 kHz SCell 510, which corresponds to 0 in the 15 kHz PCell 530). The ending symbol of the PDCCHs 515 and 525 may be judged based on the symbol index of the scheduling cell (e.g., SCell 510). That is, For any two HARQ process IDs in a given scheduled cell, if the UE is scheduled to start receiving a first PDSCH starting in symbol j by a PDCCH ending in symbol i of the scheduling cell, the UE is not expected to be scheduled to receive a PDSCH starting earlier than the end of the first PDSCH with a PDCCH that ends later than symbol i of the scheduling cell for the first PDSCH. Applying the timing of the scheduling cell may be a scheduling condition that allows the UE to resolve the scheduling order.

As discussed above with respect to FIG. 4, the UE may also take the processing times of the PDCCHs 515 and 525 into account. For any two HARQ process IDs in a given scheduled cell, if the UE is scheduled to start receiving a first PDSCH starting in symbol j by a PDCCH ending in symbol i of the scheduling cell, the UE is not expected to be scheduled to receive a PDSCH starting earlier than the end of the first PDSCH with a PDCCH that ends later than symbol i-D of the scheduling cell for the first PDSCH. Applying the offset may be a scheduling condition that allows the UE to resolve the scheduling order.

Figure 6:
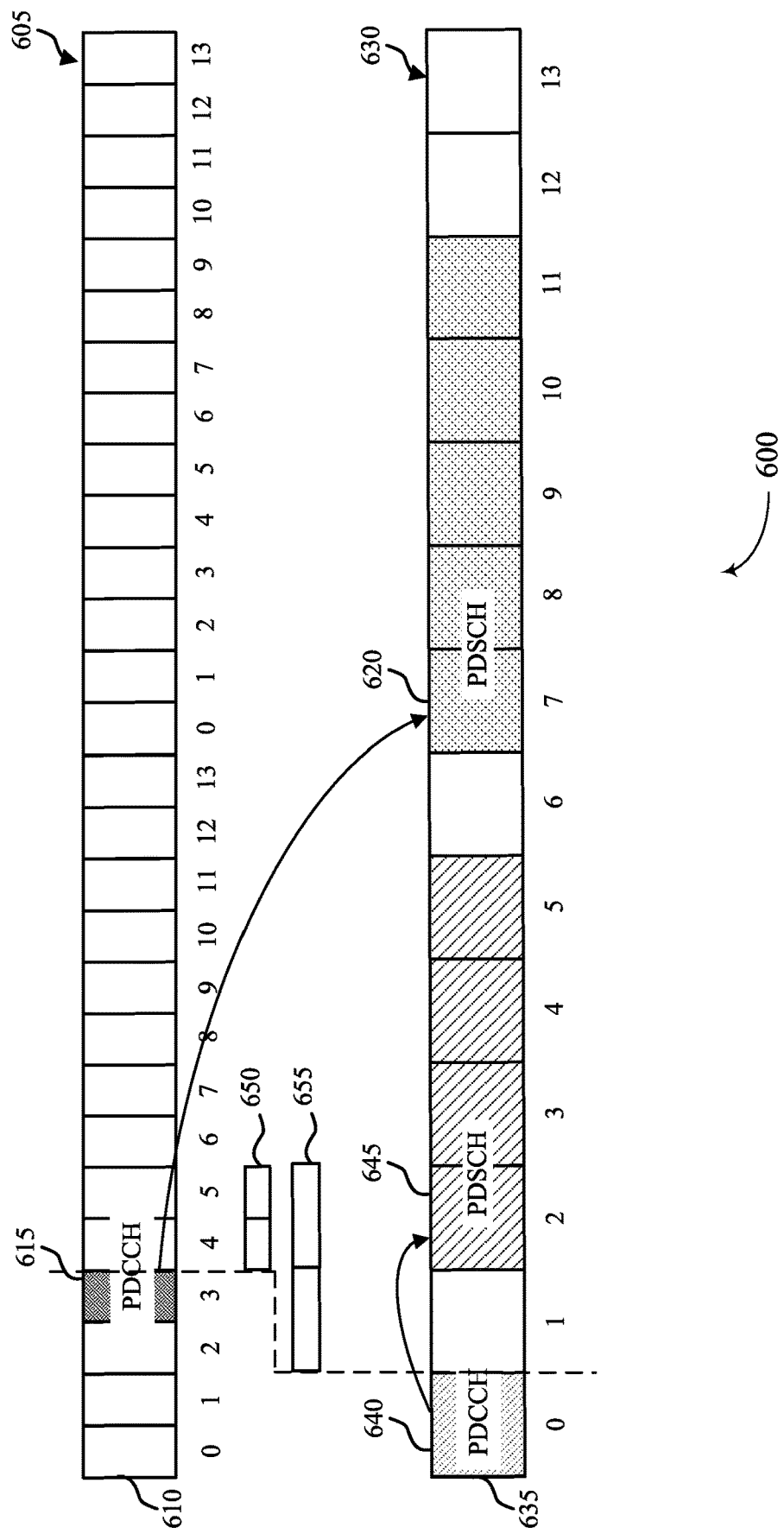

FIG. 6 illustrates an example of a block diagram 600 that supports a scheduling order for a scheduled cell having downlink control information from multiple scheduling cells in accordance with aspects of the present disclosure. The block diagram 600 may implement various aspects of the wireless communications system 100 or may be implemented by various aspects of the wireless communications system 100, among other examples. The block diagram 600 shows a scheduling cell 610 that supports two slots 605 for every one slot 630 of a scheduled cell 635. The slots 605 and 630 may be used to communicate between a UE 115 and a base station 105 as described with reference to FIG. 1, for example.

The cells 610 and 635 may have sub-carrier spacing as described in FIG. 3. For example, the cell 610 may support a first sub-carrier spacing, which may be a sub-carrier spacing of 30 kHz and the cell 635 may support a second sub-carrier spacing, which may be a sub-carrier spacing of 15 kHz. Other sub-carrier spacings may be used in various examples.

The scheduling cell 610 may include a first PDCCH 615 that schedules a first PDSCH 620. The scheduling cell 635 may include a second PDCCH 640 that schedules a second PDSCH 645. Each PDCCH 615 and 640 may include control information and each PDSCH 645 and 620 may include a data communication. From a timing point of view, the scheduling of the PDSCH 620 and 645 by the PDCCH 615 and the PDCCH 640 may be out-of-order. Techniques described herein may help the UE to resolve any challenge arising from this out-of-order scheduling, among other advantages.

The PDCCH 615 may have a processing time 650 and the PDCCH 640 may have a processing time 660. The UE may apply an offset, D, to take into account the processing times 650 and 660 of the PDCCHs 615 and 640, respectively. The value of D may be specified to consider at least one of the processing times 650 and 660 to take into account the different sub-carrier spacings. Additionally, or alternatively, the value of the offset D may depend on the UE capability (e.g., the UE reports a minimum value as the possible value D that the UE can use).

In some examples, there may be more than two scheduling cells. For example, there may be three or more scheduling cells that schedule PDSCHs for a scheduled cell. In some examples, the scheduled cell is also a scheduling cell. In other examples, there are at least two scheduling cells that are different from the scheduled cell.

Figure 7:
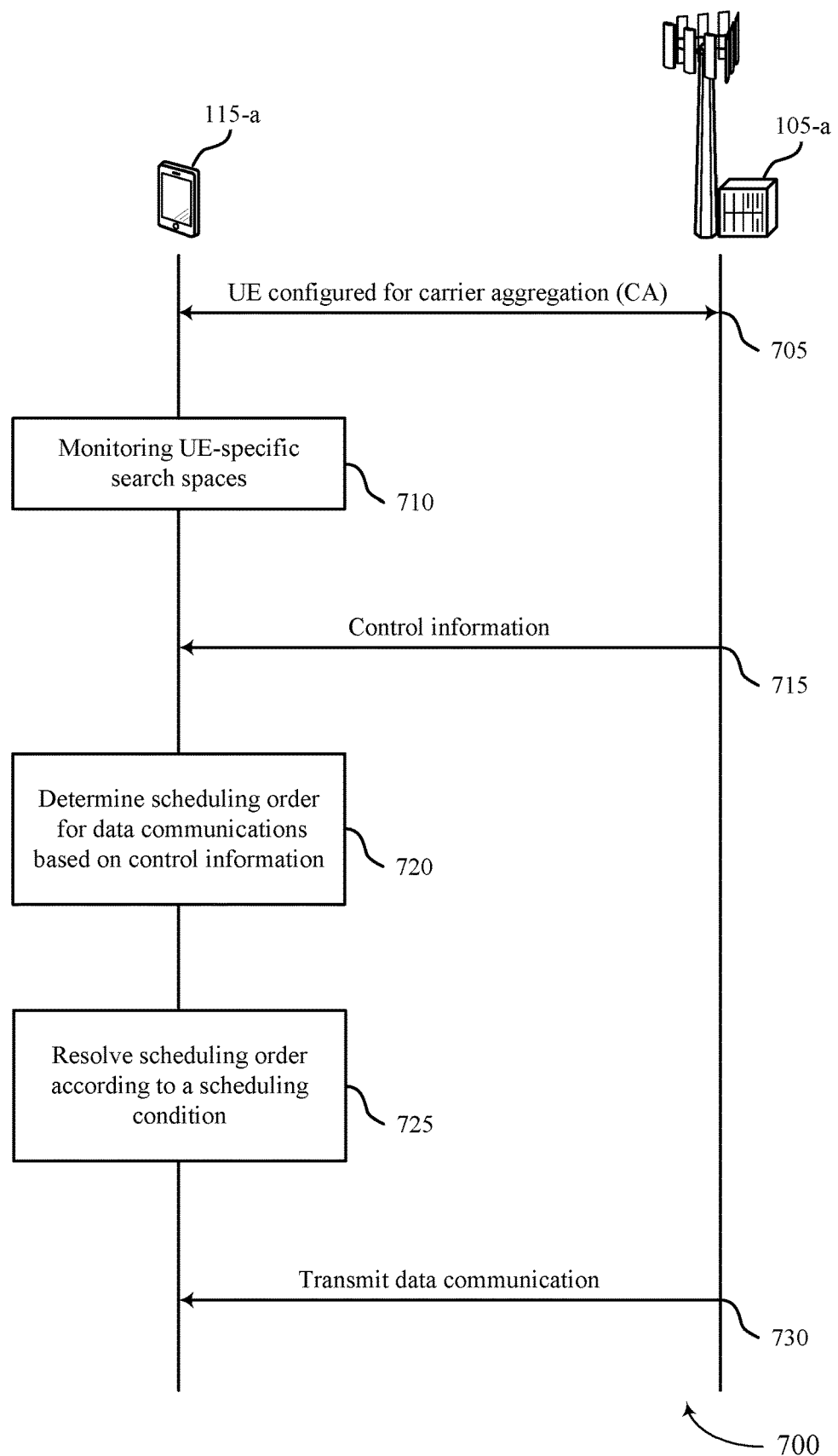
FIG. 7 illustrates an example of a swim diagram that supports a scheduling order for a scheduled cell having downlink control information from multiple scheduling cells in accordance with aspects of the present disclosure.

FIG. 7 illustrates an example of a diagram 700 that supports a scheduling order for a scheduled cell having downlink control information from multiple scheduling cells in accordance with aspects of the present disclosure. The diagram 700 may implement various aspects of the wireless communications system 100 or may be implemented by various aspects of the wireless communications system 100, among other examples. The diagram 700 may include a UE 115-a and a base station 105-a. The UE 115-a may be an example of aspects of a UE 115 as described herein. The base station 105-a may be an example of aspects of a base station 105 as described herein.

At 705, the UE 115-a and the base station 105-a may be configured for carrier aggregation. The configuration may include determining how many carriers will be used (e.g., a PCell, one or more SCells, a primary secondary cell (PS-Cell), etc.) and which one or more cells will function as scheduling cells and which one or more cells will function as scheduled cells. In some examples, the configuration may also include determining an offset value D, which may be signaled between the UE 115-a and the base station 105-a, or otherwise configured. For purposes of illustration, this example will have one PCell that functions as the scheduled cell and a scheduling cell, and one SCell that functions as a scheduling cell. In other examples, other carrier configurations may be used.

At 710, the UE 115-a may monitor the UE-specific search spaces. For example, the UE 115-a may monitor the scheduling cells for control information (e.g., PDCCH) for scheduling data communications on the scheduled cell. For example, the UE 115-a may monitor the SCell and the PCell for control information that schedules data communications on the PCell. At 715, the base station 105-a may transmit the control information to the UE 115-a in the scheduling cells. The UE 115-a may detect DCI in one or more PDCCH monitoring occasions. The DCI may provide scheduling information for a PDSCH.

At 720, the UE 115-a may determine a scheduling order for the one or more PDSCHs from the DCI. The UE 115-a may determine that the scheduling order is an out-of-order scheduling. For example, the UE 115-a may determine that the first control information (e.g., PDCCH) ends at a first symbol and schedules a first data communication (e.g., PDSCH) that starts at a second symbol and ends in a third symbol. The UE 115-a may also determine that the second control information (e.g., PDCCH) ends in a fourth symbol and schedules the second data communication (e.g., PDSCH) to start before the third symbol, that is between the first symbol and the third symbol. In this example, the first symbol precedes the second, third, and fourth symbols. This is an out-of-order scheduling that the UE 115-a may resolve according to one or more of the techniques described herein.

At 725, the UE 115-a may resolve the scheduling order according to a scheduling condition. The scheduling condition may be that the UE 115-a enables out-of-order scheduling, determines the order based on a physical timing of the scheduled cell or the scheduling cell, or adjusts the timing of an out-of-order scheduling according to an offset. Once the scheduling order is resolved, the UE 115-a may be prepared to receive the data communications.

At 730, the base station 105-a may transmit the data communications according to the scheduling order. The UE 115-a may receive the data communications using the resolved scheduling order.

Figure 8:
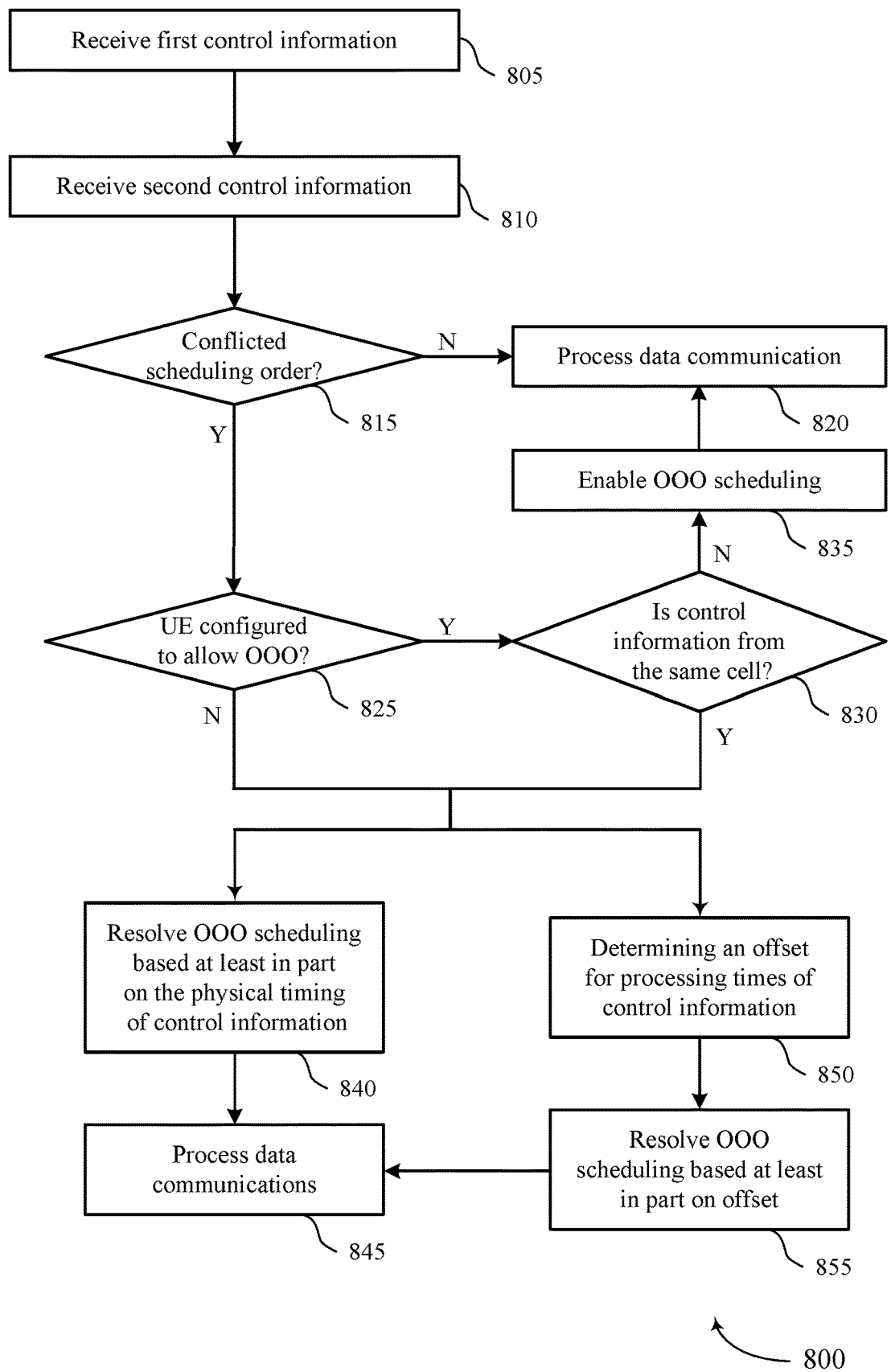
FIG. 8 illustrates an example of a flowchart illustrating a method that supports a scheduling order for a scheduled cell having downlink control information from multiple scheduling cells in accordance with aspects of the present disclosure.

FIG. 8 illustrates an example of a flowchart illustrating a method 800 that supports a scheduling order for a scheduled cell having downlink control information from multiple scheduling cells in accordance with aspects of the present disclosure. The method 800 may be performed by a UE, such as a UE 115 as described herein. The method 800 may implement various aspects of the wireless communications system 100 or may be implemented by various aspects of the wireless communications system 100, among other examples.

At 805, the UE may receive a first control information, which may be DCI in a PDCCH monitoring occasion. At 810, the UE may receive a second control information, which may be DCI in a PDCCH monitoring occasion. The UE may receive the first and second control information at the same time, concurrently (e.g., at least partially overlapping), or at different times. The first and second control information may be received on one or more scheduling cells. The one or more scheduling cells may be a scheduling cell and another scheduling cell that is also a scheduled cell. The one or more scheduling cells may also be two scheduling cells that are separate from (e.g., are different than) the scheduled cell. In another example, the scheduling cell may be the scheduled cell.

At 815, the UE may determine if there is a scheduling order that is out-of-order. For example, the UE may determine this if, for any two HARQ process IDs in a given scheduled cell, if the UE is scheduled to start receiving a first PDSCH starting in symbol j by a PDCCH ending in symbol i, the UE is not expected to be scheduled to receive a PDSCH starting earlier than the end of the first PDSCH with a PDCCH that ends later than symbol i.

At 815, if the UE determines there is no out-of-order scheduling order, then the UE processes the scheduled data communications at 820. However, if the UE determines that there is out-of-order scheduling (e.g., the UE is scheduled to start receiving a first PDSCH starting in symbol j by a PDCCH ending in symbol i, and the UE is also scheduled to receive a PDSCH starting earlier than the end of the first PDSCH with a PDCCH that ends later than symbol i), the UE may determine if it is configured to allow out-of-order scheduling at 825. Whether the UE allows out-of-order scheduling may be a first scheduling condition.

If the UE is does allow out-of-order scheduling, the method 800 proceeds to 830 to determine whether the two DCIs were from the same scheduling cell or from different scheduling cells. If the DCIs were from different scheduling cells, the method 800 proceeds to 835 and enables the scheduling as it is. That is, the UE processes the data communications according to the DCI, at 820.

However, if the control information is from the same cell, the UE may not be configured to enable the out-of-order scheduling. In that case, the method 800 may proceed to resolve the scheduling order in one of several ways, as if the UE was not configured to resolve out-or-order scheduling at 825. The method 800 may proceed to 835 or 850.

At 835, the method 800 may resolve the out-or-order scheduling based at least in part on a physical timing of the control information according to the scheduled cell or to the scheduling cell. Once resolved, the method 800 may process the data communications accordingly at 845.

At 850, the method 800 may determine an offset, D, for the processing time of at least one of the control information. At 855, the method 800 may resolve the out-of-order scheduling based at least in part on the offset. The method 800 may process the data communications accordingly at 845.

In some examples, the method 800 may apply an offset as well as use a physical timing of at least one of the control information symbols. In other examples, the method 800 may use only one of the scheduling conditions to resolve the out-of-order scheduling. In some examples, the method 800 may not resolve the out-of-order scheduling in any way if the UE is configured to enable out-of-order scheduling but the DCI is from the same scheduling cell.

Figure 9:
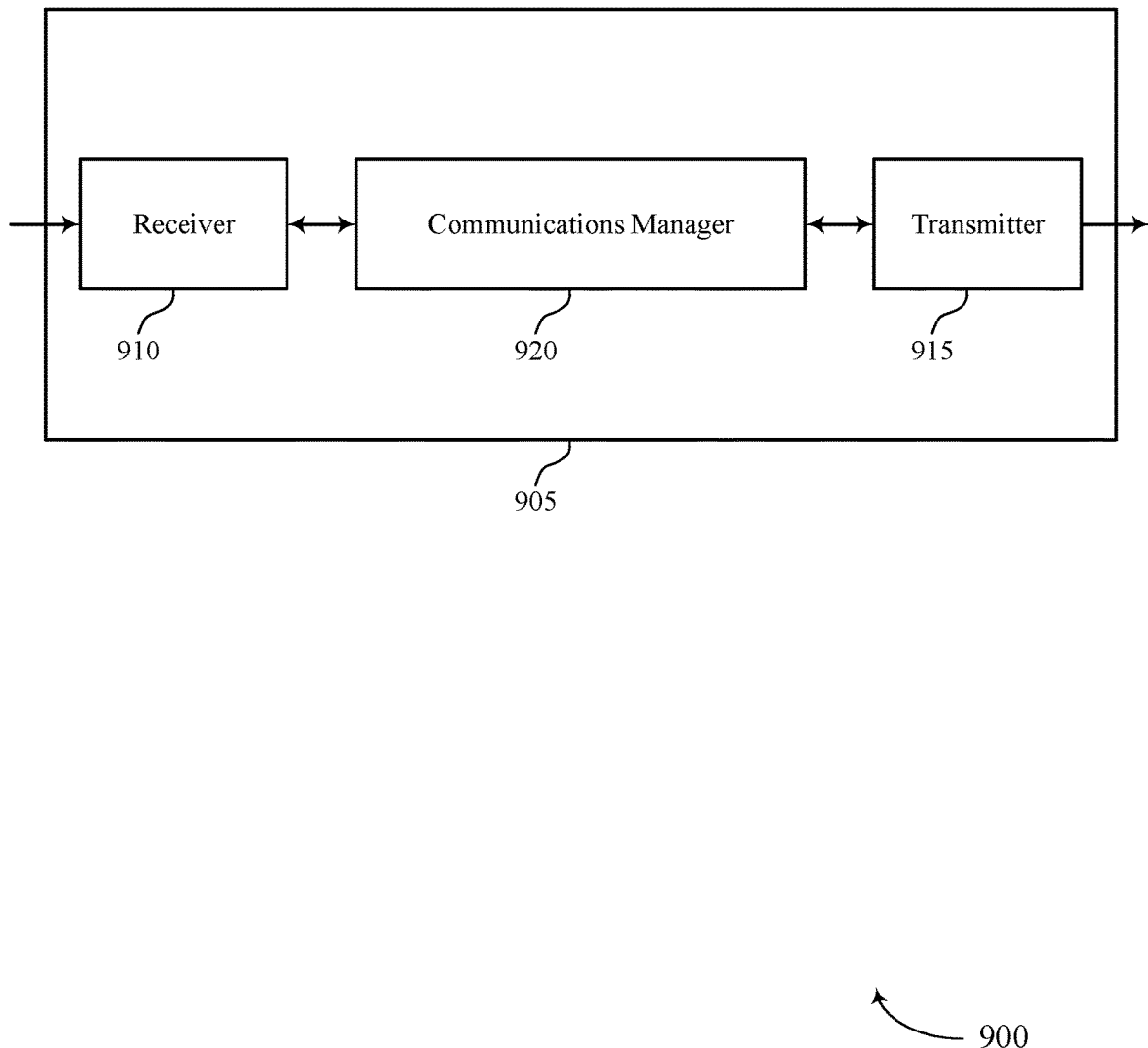
FIGS. 9 and 10 show block diagrams of devices that support scheduling order for a scheduled cell having downlink control information from multiple scheduling cells in accordance with aspects of the present disclosure.

FIG. 9 shows a block diagram 900 of a device 905 that supports a scheduling order for a scheduled cell having downlink control information from multiple scheduling cells in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses). The communications manager 920 may be an aspect or an example of the communications manager 160 as shown in FIG. 1.

The receiver 910 may provide a means for receiving information such as packets, user data, control information, or any combination thereof associated with various information channels (e.g., control channels, data channels, information channels related to a scheduling order for a scheduled cell having downlink control information from multiple scheduling cells). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a scheduling order for a scheduled cell having downlink control information from multiple scheduling cells). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of a scheduling order for a scheduled cell having downlink control information from multiple scheduling cells as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for identifying that the UE is in carrier aggregation communication with a first cell having a first sub-carrier spacing and a second cell having a second sub-carrier spacing different than the first sub-carrier spacing. The communications manager 920 may be configured as or otherwise support a means for monitoring one or more UE-specific search spaces of the first cell for first control information scheduling a first data communication on the first cell and one or more UE-specific search spaces of the first cell or the second cell for second control information scheduling a second data communication on the first cell. The communications manager 920 may be configured as or otherwise support a means for resolving a scheduling order of the first control information scheduling the first data communication and the second control information scheduling the second data communication based on the monitoring and on a scheduling condition.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improving carrier aggregation functioning, reducing power consumption, and improving efficiency of utilizing communication resources.

Figure 10:
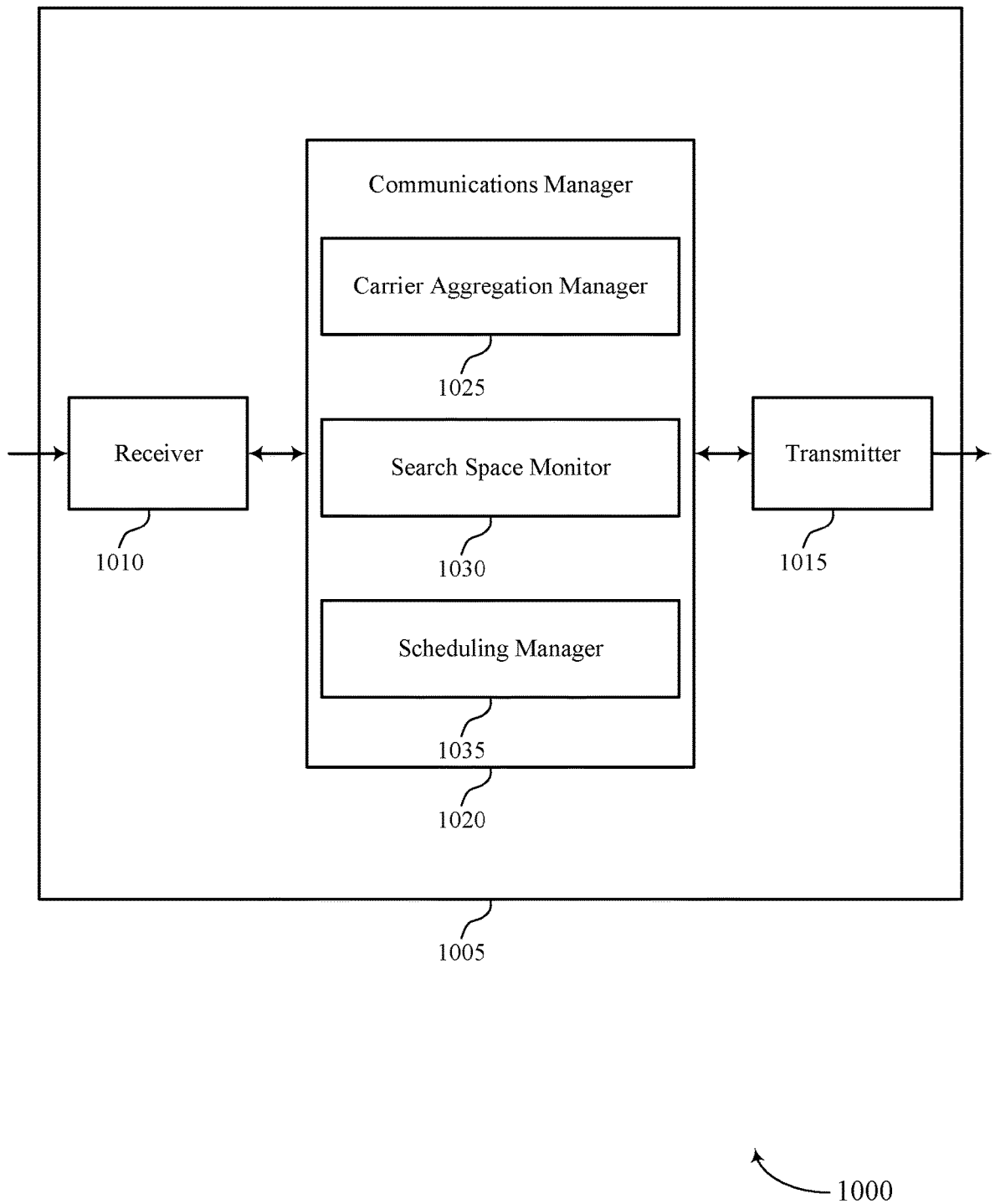

FIG. 10 shows a block diagram 1000 of a device 1005 that supports a scheduling order for a scheduled cell having downlink control information from multiple scheduling cells in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to a scheduling order for a scheduled cell having downlink control information from multiple scheduling cells). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to a scheduling order for a scheduled cell having downlink control information from multiple scheduling cells). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of a scheduling order for a scheduled cell having downlink control information from multiple scheduling cells as described herein. For example, the communications manager 1020 may include a carrier aggregation manager 1025, a search space monitor 1030, a scheduling manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The carrier aggregation manager 1025 may be configured as or otherwise support a means for identifying that the UE is in carrier aggregation communication with a first cell having a first sub-carrier spacing and a second cell having a second sub-carrier spacing different than the first sub-carrier spacing. The search space monitor 1030 may be configured as or otherwise support a means for monitoring one or more UE-specific search spaces of the first cell for first control information scheduling a first data communication on the first cell and one or more UE-specific search spaces of the first cell or the second cell for second control information scheduling a second data communication on the first cell. The scheduling manager 1035 may be configured as or otherwise support a means for resolving a scheduling order of the first control information scheduling the first data communication and the second control information scheduling the second data communication based on the monitoring and on a scheduling condition.

Figure 11:
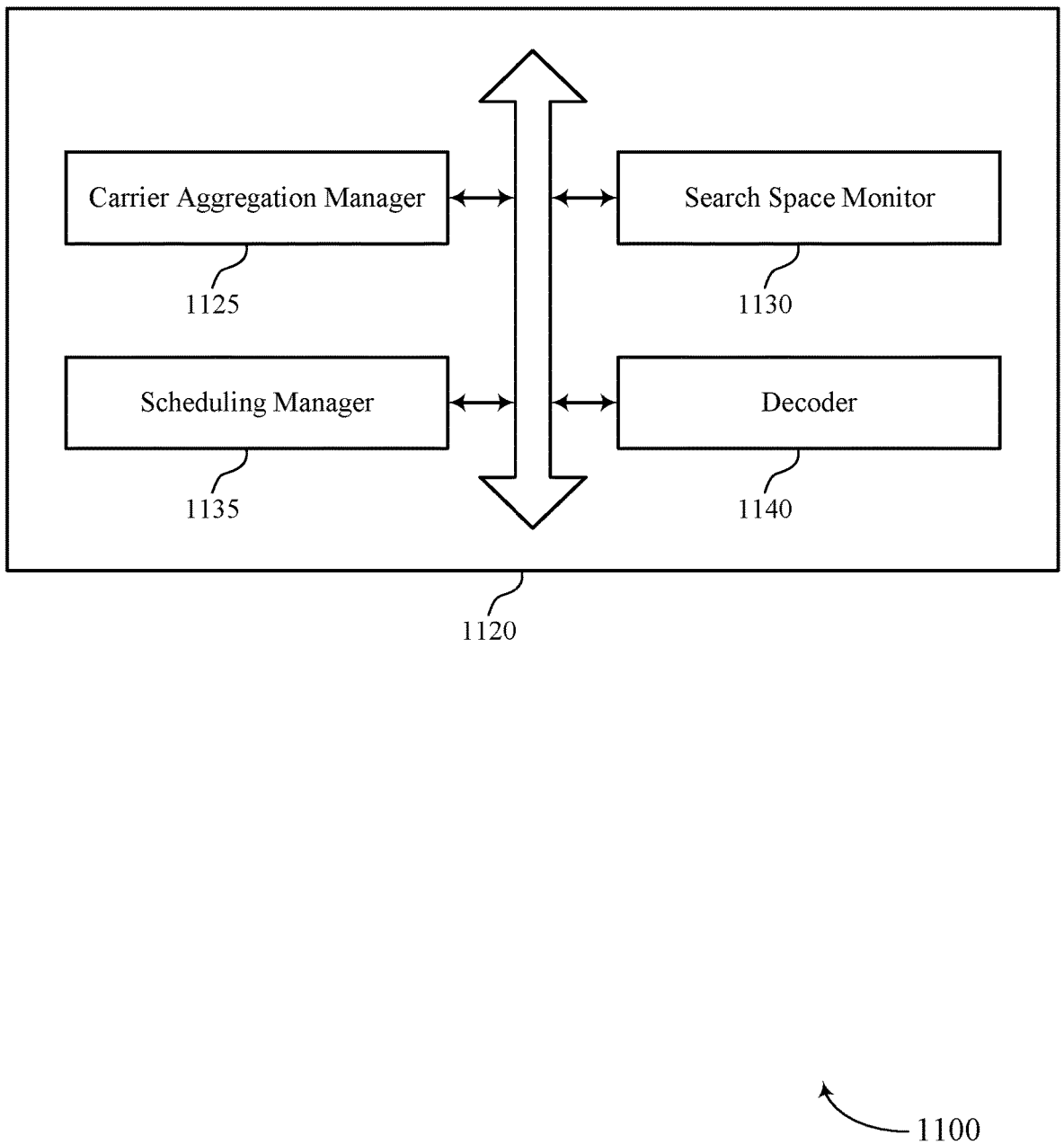
FIG. 11 shows a block diagram of a communications manager that supports a scheduling order for a scheduled cell having downlink control information from multiple scheduling cells in accordance with aspects of the present disclosure.

FIG. 11 shows a block diagram 1100 of a communications manager 1120 that supports a scheduling order for a scheduled cell having downlink control information from multiple scheduling cells in accordance with aspects of the present disclosure. The communications manager 1120 may be an example of aspects of a communications manager 920, a communications manager 1020, or both, as described herein. The communications manager 1120, or various components thereof, may be an example of means for performing various aspects of a scheduling order for a scheduled cell having downlink control information from multiple scheduling cells as described herein. For example, the communications manager 1120 may include a carrier aggregation manager 1125, a search space monitor 1130, a scheduling manager 1135, a decoder 1140, or any combination thereof. Each of these components may communicate, directly or indirectly, with one another (e.g., via one or more buses).

The communications manager 1120 may support wireless communication at a UE in accordance with examples as disclosed herein. The carrier aggregation manager 1125 may be configured as or otherwise support a means for identifying that the UE is in carrier aggregation communication with a first cell having a first sub-carrier spacing and a second cell having a second sub-carrier spacing different than the first sub-carrier spacing. The search space monitor 1130 may be configured as or otherwise support a means for monitoring one or more UE-specific search spaces of the first cell for first control information scheduling a first data communication on the first cell and one or more UE-specific search spaces of the first cell or the second cell for second control information scheduling a second data communication on the first cell. The scheduling manager 1135 may be configured as or otherwise support a means for resolving a scheduling order of the first control information scheduling the first data communication and the second control information scheduling the second data communication based on the monitoring and on a scheduling condition.

In some examples, the scheduling order may include that the first control information ends at a first symbol and schedules a first data communication that starts at a second symbol and ends in a third symbol and that the second control information ends in a fourth symbol and schedules the second data communication to start before the third symbol. In some examples, the first symbol precedes the second, third, and fourth symbols.

In some examples, the scheduling manager 1135 may be configured as or otherwise support a means for determining that the scheduling condition indicates that the UE supports a scheduling order. In some examples, the scheduling manager 1135 may be configured as or otherwise support a means for determining that the first control information scheduling the first data communication and the second control information scheduling the second data communication are scheduled by different cells, where resolving the scheduling order further includes. In some examples, the scheduling manager 1135 may be configured as or otherwise support a means for enabling the scheduling order.

In some examples, the scheduling manager 1135 may be configured as or otherwise support a means for transmitting an indication that the UE supports a scheduling order to a base station, where resolving the scheduling order is further based on transmitting the indication. In some examples, the scheduling manager 1135 may be configured as or otherwise support a means for receiving a configuration that indicates the UE is to support a scheduling order, where resolving the scheduling order is further based on receiving the configuration.

In some examples, the scheduling manager 1135 may be configured as or otherwise support a means for determining that the scheduling condition indicates that the UE supports a scheduling order. In some examples, the scheduling manager 1135 may be configured as or otherwise support a means for determining that the first control information scheduling the first data communication and the second control information scheduling the second data communication are scheduled by the first cell, where resolving the scheduling order further includes. In some examples, the scheduling manager 1135 may be configured as or otherwise support a means for disabling the scheduling order.

In some examples, the scheduling manager 1135 may be configured as or otherwise support a means for determining an ending symbol of the second control information, where the scheduling condition includes the ending symbol of the second control information, and where resolving the scheduling order is further based on the ending symbol of the second control information.

In some examples, the second data communication begins after the ending symbol of the first control information. In some examples, the first cell is a scheduling cell and the second cell is a scheduled cell. In some examples, the first cell and the second cell are scheduling cells. In some examples, the first cell is a primary cell and the second cell is a secondary cell.

In some examples, the scheduling manager 1135 may be configured as or otherwise support a means for determining an ending symbol of the first control information, where the scheduling condition is the ending symbol of the first control information, and resolving the scheduling order is further based on the ending symbol of the first control information.

In some examples, the scheduling manager 1135 may be configured as or otherwise support a means for determining an offset based on a processing time difference between decoding the first control information and the second control information at the UE, where the scheduling condition includes the offset.

In some examples, the scheduling manager 1135 may be configured as or otherwise support a means for determining an ending symbol of the second control information, where resolving the scheduling order is further based on the ending symbol of the second control information and the offset. In some examples, the first data communication is received before an end of the second data communication when the first control information ends at least by the ending symbol of the second control information adjusted with the offset.

In some examples, the scheduling manager 1135 may be configured as or otherwise support a means for determining an ending symbol of the first control information, where resolving the scheduling order is further based on the ending symbol of the first control information and the offset.

In some examples, the second data communication is received before an end of the first data communication when the second control information ends at least by the ending symbol of the first control information adjusted with the offset.

In some examples, the scheduling manager 1135 may be configured as or otherwise support a means for receiving a configuration that identifies the offset from a base station. In some examples, the scheduling manager 1135 may be configured as or otherwise support a means for determining the offset based on a difference between the first sub-carrier spacing and the second sub-carrier spacing.

In some examples, the scheduling manager 1135 may be configured as or otherwise support a means for determining the offset based on a number of symbols in the first control information and a number of symbols in the second control information.

In some examples, the decoder 1140 may be configured as or otherwise support a means for decoding the first data communication and the second data communication based on the resolved scheduling order.

In some examples, the carrier aggregation manager 1125 may be configured as or otherwise support a means for transmitting an indication that the UE is configured for cross-carrier scheduling from the secondary cell to the primary cell to a base station.

In some examples, monitoring the UE-specific search spaces of the first cell for the first control information or the second control information is in accordance with a physical downlink control channel monitoring occasion of the first cell. In some examples, the first data communication and the second data communication on the first cell are over a physical downlink shared channel.

Figure 12:
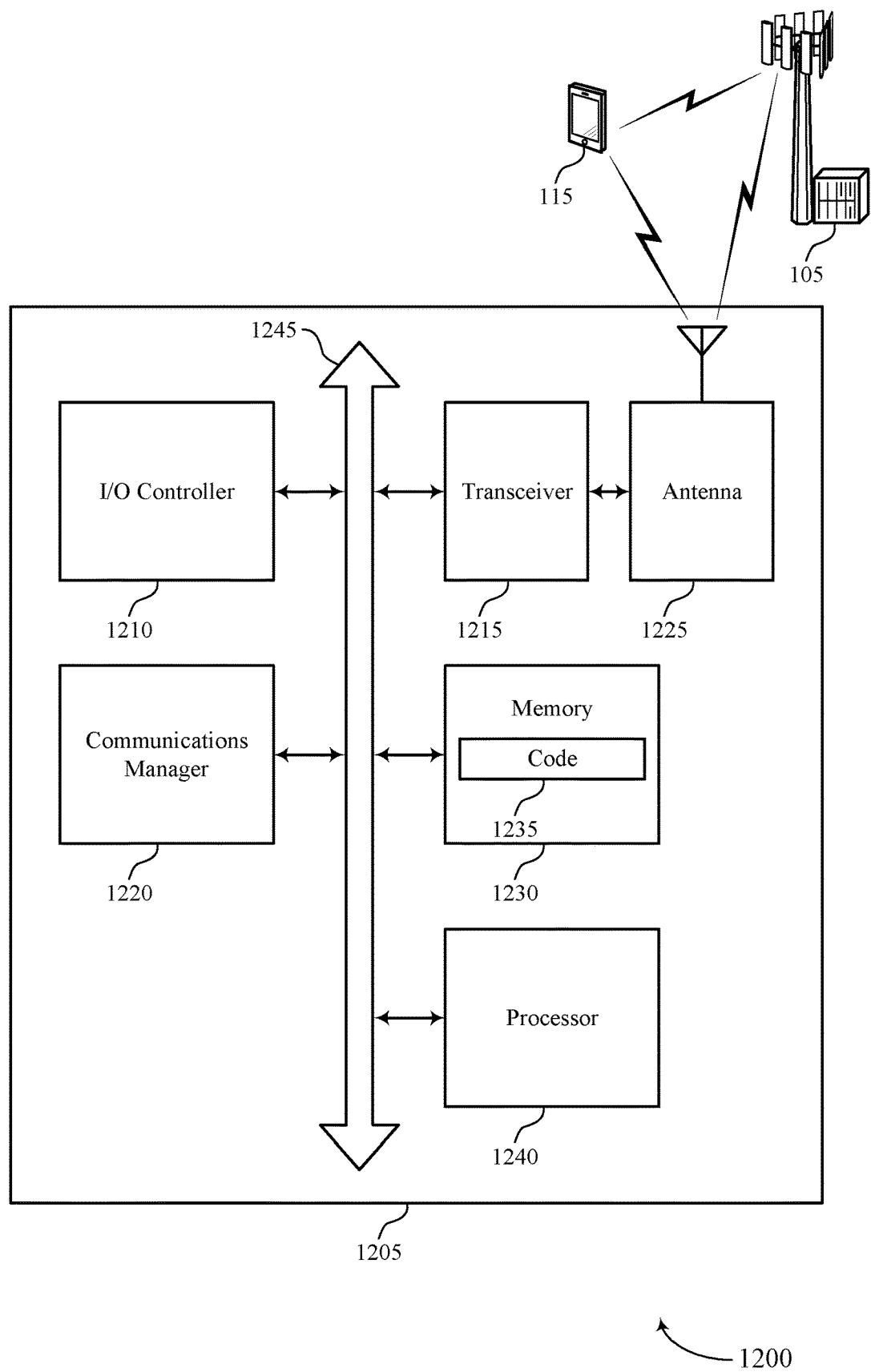
FIG. 12 shows a diagram of a system including a device that supports a scheduling order for a scheduled cell having downlink control information from multiple scheduling cells in accordance with aspects of the present disclosure.

FIG. 12 shows a diagram of a system 1200 including a device 1205 that supports a scheduling order for a scheduled cell having downlink control information from multiple scheduling cells in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting a scheduling order for a scheduled cell having downlink control information from multiple scheduling cells). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for identifying that the UE is in carrier aggregation communication with a first cell having a first sub-carrier spacing and a second cell having a second sub-carrier spacing different than the first sub-carrier spacing. The communications manager 1220 may be configured as or otherwise support a means for monitoring one or more UE-specific search spaces of the first cell for first control information scheduling a first data communication on the first cell and one or more UE-specific search spaces of the first cell or the second cell for second control information scheduling a second data communication on the first cell. The communications manager 1220 may be configured as or otherwise support a means for resolving a scheduling order of the first control information scheduling the first data communication and the second control information scheduling the second data communication based on the monitoring and on a scheduling condition.

By including or configuring the communications manager 1220 in accordance with examples as described herein, the device 1205 may support techniques for improved communication reliability, reduced latency, improved user experience related to reduced processing, and reduced power consumption.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of a scheduling order for a scheduled cell having downlink control information from multiple scheduling cells as described herein, or the processor 1240 and the memory 1230 may be otherwise configured to perform or support such operations.

Figure 13:
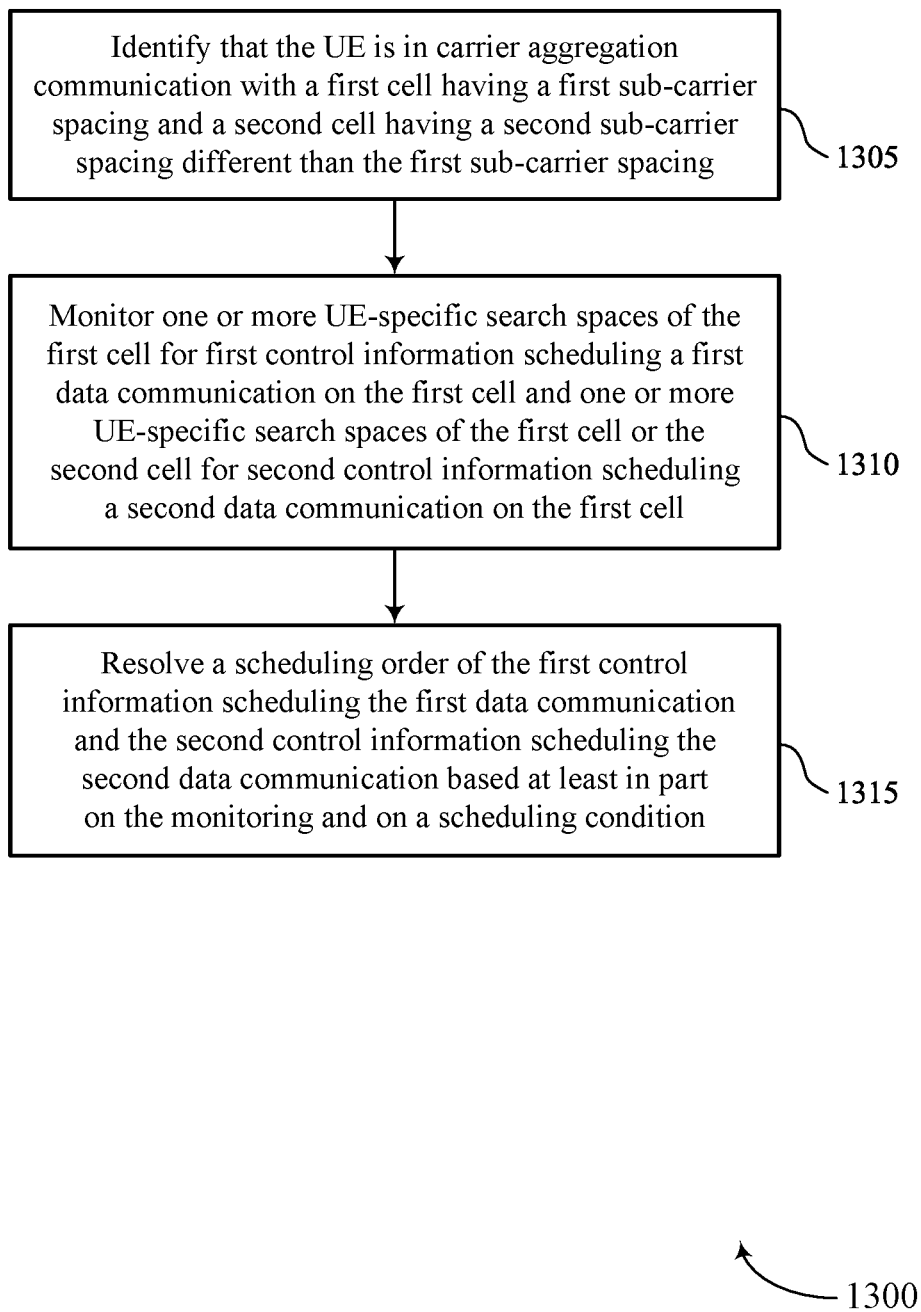
FIGS. 13 and 14 show flowcharts illustrating methods that support scheduling order for a scheduled cell having downlink control information from multiple scheduling cells in accordance with aspects of the present disclosure.

FIG. 13 shows a flowchart illustrating a method 1300 that supports a scheduling order for a scheduled cell having downlink control information from multiple scheduling cells in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1305, the method may include identifying that the UE is in carrier aggregation communication with a first cell having a first sub-carrier spacing and a second cell having a second sub-carrier spacing different than the first sub-carrier spacing. The operations of 1305 may be performed in accordance with examples as disclosed herein. In some examples, aspects of the operations of 1305 may be performed by a carrier aggregation manager 1125 as described with reference to FIG. 11.

At 1310, the method may include monitoring one or more UE-specific search spaces of the first cell for first control information scheduling a first data communication on the first cell and one or more UE-specific search spaces of the first cell or the second cell for second control information scheduling a second data communication on the first cell. The operations of 1310 may be performed in accordance with examples as disclosed herein. In some examples, aspects of the operations of 1310 may be performed by a search space monitor 1130 as described with reference to FIG. 11.

At 1315, the method may include resolving a scheduling order of the first control information scheduling the first data communication and the second control information scheduling the second data communication based on the monitoring and on a scheduling condition. The operations of 1315 may be performed in accordance with examples as disclosed herein. In some examples, aspects of the operations of 1315 may be performed by a scheduling manager 1135 as described with reference to FIG. 11.

Figure 14:
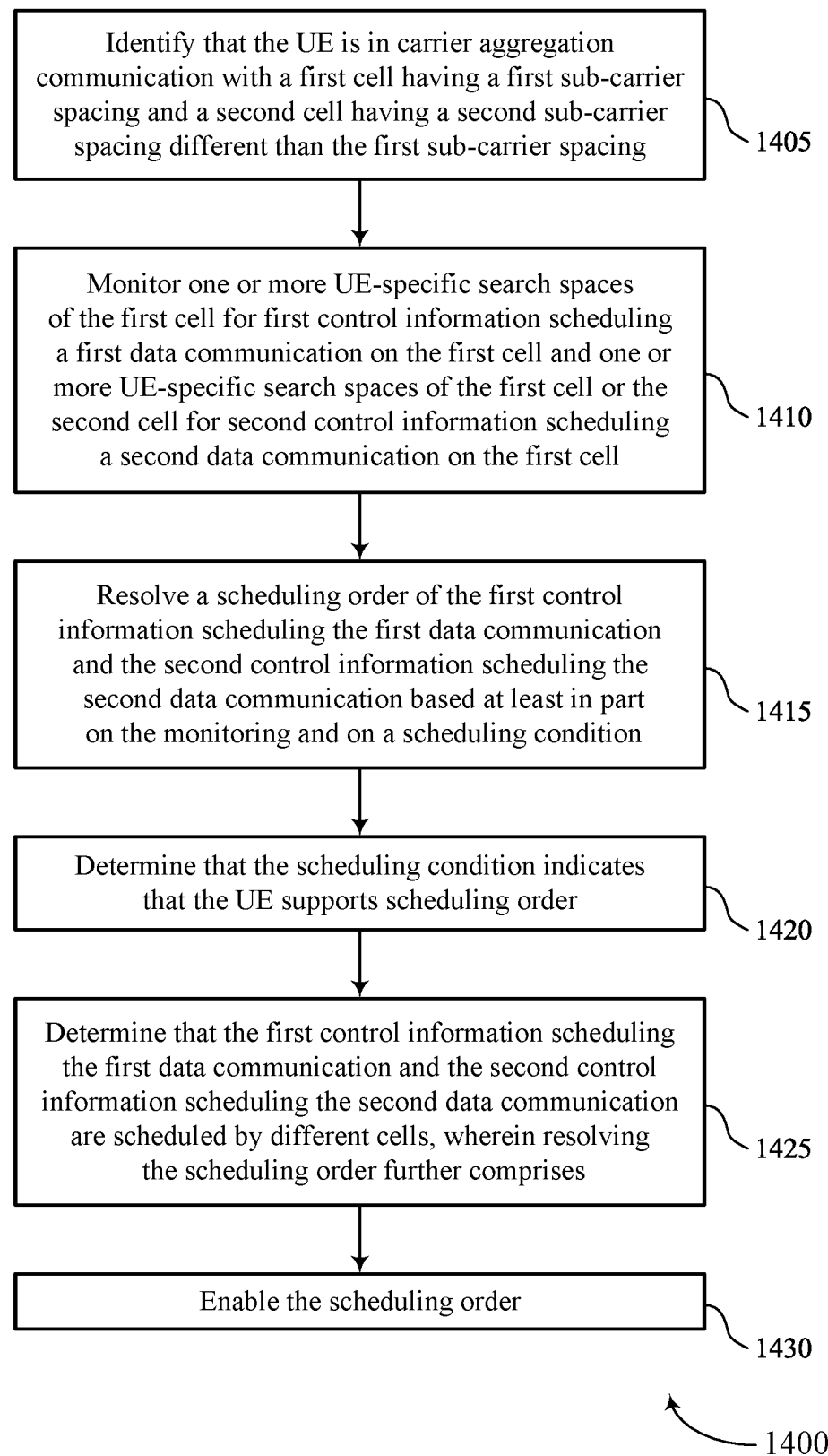

FIG. 14 shows a flowchart illustrating a method 1400 that supports a scheduling order for a scheduled cell having downlink control information from multiple scheduling cells in accordance with aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1405, the method may include identifying that the UE is in carrier aggregation communication with a first cell having a first sub-carrier spacing and a second cell having a second sub-carrier spacing different than the first sub-carrier spacing. The operations of 1405 may be performed in accordance with examples as disclosed herein. In some examples, aspects of the operations of 1405 may be performed by a carrier aggregation manager 1125 as described with reference to FIG. 11.

At 1410, the method may include monitoring one or more UE-specific search spaces of the first cell for first control information scheduling a first data communication on the first cell and one or more UE-specific search spaces of the first cell or the second cell for second control information scheduling a second data communication on the first cell. The operations of 1410 may be performed in accordance with examples as disclosed herein. In some examples, aspects of the operations of 1410 may be performed by a search space monitor 1130 as described with reference to FIG. 11.

At 1415, the method may include resolving a scheduling order of the first control information scheduling the first data communication and the second control information scheduling the second data communication based on the monitoring and on a scheduling condition. The operations of 1415 may be performed in accordance with examples as disclosed herein. In some examples, aspects of the operations of 1415 may be performed by a scheduling manager 1135 as described with reference to FIG. 11.

At 1420, the method may include determining that the scheduling condition indicates that the UE supports a scheduling order. The operations of 1420 may be performed in accordance with examples as disclosed herein. In some examples, aspects of the operations of 1420 may be performed by a scheduling manager 1135 as described with reference to FIG. 11.

At 1425, the method may include determining that the first control information scheduling the first data communication and the second control information scheduling the second data communication are scheduled by different cells, where resolving the scheduling order further includes. The operations of 1425 may be performed in accordance with examples as disclosed herein. In some examples, aspects of the operations of 1425 may be performed by a scheduling manager 1135 as described with reference to FIG. 11.

At 1430, the method may include enabling the scheduling order. The operations of 1430 may be performed in accordance with examples as disclosed herein. In some examples, aspects of the operations of 1430 may be performed by a scheduling manager 1135 as described with reference to FIG. 11.

The following provides an overview of aspects of the present disclosure:

Aspect 1: A method for wireless communication at a UE, comprising: identifying that the UE is in carrier aggregation communication with a first cell having a first sub-carrier spacing and a second cell having a second sub-carrier spacing different than the first sub-carrier spacing; monitoring one or more UE-specific search spaces of the first cell for first control information scheduling a first data communication on the first cell and one or more UE-specific search spaces of the first cell or the second cell for second control information scheduling a second data communication on the first cell; and resolving a scheduling order of the first control information scheduling the first data communication and the second control information scheduling the second data communication based at least in part on the monitoring and on a scheduling condition.

Aspect 2: The method of aspect 1, wherein the scheduling order comprises that the first control information ends at a first symbol and schedules a first data communication that starts at a second symbol and ends in a third symbol and that the second control information ends in a fourth symbol and schedules the second data communication to start before the third symbol, the first symbol precedes the second, third, and fourth symbols.

Aspect 3: The method of any of aspects 1 through 2, further comprising: determining that the scheduling condition indicates that the UE supports scheduling order; determining that the first control information scheduling the first data communication and the second control information scheduling the second data communication are scheduled by different cells, wherein resolving the scheduling order further comprises; and enabling the scheduling order.

Aspect 4: The method of aspect 3, further comprising: transmitting an indication that the UE supports scheduling order to a base station, wherein resolving the scheduling order is further based at least in part on transmitting the indication.

Aspect 5: The method of any of aspects 3 through 4, further comprising: receiving a configuration that indicates the UE is to support scheduling order, wherein resolving the scheduling order is further based at least in part on receiving the configuration.

Aspect 6: The method of any of aspects 1 through 5, further comprising: determining that the scheduling condition indicates that the UE supports scheduling order; determining that the first control information scheduling the first data communication and the second control information scheduling the second data communication are scheduled by the first cell, wherein resolving the scheduling order further comprises; and disabling the scheduling order.

Aspect 7: The method of any of aspects 1 through 6, further comprising: determining an ending symbol of the second control information, wherein the scheduling condition comprises the ending symbol of the second control information, and wherein resolving the scheduling order is further based at least in part on the ending symbol of the second control information.

Aspect 8: The method of aspect 7, wherein the second data communication begins after the ending symbol of the first control information.

Aspect 9: The method of any of aspects 7 through 8, wherein the first cell is a scheduling cell and the second cell is a scheduled cell.

Aspect 10: The method of any of aspects 7 through 9, wherein the first cell and the second cell are scheduling cells.

Aspect 11: The method of any of aspects 1 through 6, further comprising: determining an ending symbol of the first control information, wherein the scheduling condition is the ending symbol of the first control information, and resolving the scheduling order is further based at least in part on the ending symbol of the first control information.

Aspect 12: The method of aspect 11, wherein the first data communication is scheduled to begin after the ending symbol of the second control information.

Aspect 13: The method of any of aspects 11 through 12, wherein the first cell is a scheduling cell and the second cell is a scheduled cell.

Aspect 14: The method of any of aspects 11 through 13, wherein the first cell and the second cell are scheduling cells.

Aspect 15: The method of any of aspects 1 through 14, further comprising: determining an offset based at least in part on a processing time difference between decoding the first control information and the second control information at the UE, wherein the scheduling condition comprises the offset.

Aspect 16: The method of aspect 15, further comprising: determining an ending symbol of the second control information, wherein resolving the scheduling order is further based at least in part on the ending symbol of the second control information and the offset.

Aspect 17: The method of aspect 16, wherein the first data communication is received before an end of the second data communication when the first control information ends at least by the ending symbol of the second control information adjusted with the offset.

Aspect 18: The method of any of aspects 15 through 17, further comprising: determining an ending symbol of the first control information, wherein resolving the scheduling order is further based at least in part on the ending symbol of the first control information and the offset.

Aspect 19: The method of aspect 18, wherein the second data communication is received before an end of the first data communication when the second control information ends at least by the ending symbol of the first control information adjusted with the offset.

Aspect 20: The method of any of aspects 15 through 19, further comprising: receiving a configuration that identifies the offset from a base station.

Aspect 21: The method of any of aspects 15 through 20, further comprising: determining the offset based at least in part on a difference between the first sub-carrier spacing and the second sub-carrier spacing.

Aspect 22: The method of any of aspects 15 through 21, further comprising: determining the offset based at least in part on a number of symbols in the first control information and a number of symbols in the second control information.

Aspect 23: The method of any of aspects 1 through 22, further comprising: decoding the first data communication and the second data communication based at least in part on the resolved scheduling order.

Aspect 24: The method of any of aspects 1 through 23, wherein the first cell is a primary cell and the second cell is a secondary cell.

Aspect 25: The method of aspect 24, further comprising: transmitting an indication that the UE is configured for cross-carrier scheduling from the secondary cell to the primary cell to a base station.

Aspect 26: The method of any of aspects 1 through 25, wherein monitoring the UE-specific search spaces of the first cell for the first control information or the second control information is in accordance with a physical downlink control channel monitoring occasion of the first cell.

Aspect 27: The method of any of aspects 1 through 26, wherein the first data communication and the second data communication on the first cell are over a physical downlink shared channel.

Aspect 28: An apparatus for wireless communication at a UE, comprising a processor; memory coupled with the processor; and instructions stored in the memory and executable by the processor to cause the apparatus to perform a method of any of aspects 1 through 27.

Aspect 29: An apparatus for wireless communication at a UE, comprising at least one means for performing a method of any of aspects 1 through 27.

Aspect 30: A non-transitory computer-readable medium storing code for wireless communication at a UE, the code comprising instructions executable by a processor to perform a method of any of aspects 1 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
identifying that the UE is in carrier aggregation communication with a first cell having a first sub-carrier spacing and a second cell having a second sub-carrier spacing different than the first sub-carrier spacing;
monitoring one or more UE-specific search spaces of the first cell for first control information scheduling a first data communication on the first cell and one or more UE-specific search spaces of the first cell or the second cell for second control information scheduling a second data communication on the first cell;
resolving a scheduling order of the first control information scheduling the first data communication and the second control information scheduling the second data communication based at least in part on the monitoring and on a scheduling condition; and
determining an ending symbol of the second control information, wherein the scheduling condition comprises the ending symbol of the second control information, and wherein resolving the scheduling order is based at least in part on the ending symbol of the second control information.

2. The method of claim 1, wherein the second data communication begins after the ending symbol of the first control information.

3. The method of claim 1, wherein the first cell is a scheduling cell and the second cell is a scheduled cell.

4. The method of claim 1, wherein the first cell and the second cell are scheduling cells.

5. The method of claim 1, further comprising:
decoding the first data communication and the second data communication based at least in part on the resolved scheduling order.

6. The method of claim 1, wherein the first cell is a primary cell and the second cell is a secondary cell.

7. The method of claim 6, further comprising:
transmitting an indication that the UE is configured for cross-carrier scheduling from the secondary cell to the primary cell to a base station.

8. The method of claim 1, wherein monitoring the UE-specific search spaces of the first cell for the first control information or the second control information is in accordance with a physical downlink control channel monitoring occasion of the first cell.

9. A method for wireless communication at a user equipment (UE), comprising:
identifying that the UE is in carrier aggregation communication with a first cell having a first sub-carrier spacing and a second cell having a second sub-carrier spacing different than the first sub-carrier spacing;
monitoring one or more UE-specific search spaces of the first cell for first control information scheduling a first data communication on the first cell and one or more UE-specific search spaces of the first cell or the second cell for second control information scheduling a second data communication on the first cell;
resolving a scheduling order of the first control information scheduling the first data communication and the second control information scheduling the second data communication based at least in part on the monitoring and on a scheduling condition,
wherein the scheduling order comprises that the first control information ends at a first symbol and schedules a first data communication that starts at a second symbol and ends in a third symbol and that the second control information ends in a fourth symbol and schedules the second data communication to start before the third symbol, and
the first symbol precedes the second, third, and fourth symbols.

10. A method for wireless communication at a user equipment (UE), comprising:
identifying that the UE is in carrier aggregation communication with a first cell having a first sub-carrier spacing and a second cell having a second sub-carrier spacing different than the first sub-carrier spacing;
monitoring one or more UE-specific search spaces of the first cell for first control information scheduling a first data communication on the first cell and one or more UE-specific search spaces of the first cell or the second cell for second control information scheduling a second data communication on the first cell;
resolving a scheduling order of the first control information scheduling the first data communication and the second control information scheduling the second data communication based at least in part on the monitoring and on a scheduling condition;
determining that the scheduling condition indicates that the UE supports scheduling order; and
determining that the first control information scheduling the first data communication and the second control information scheduling the second data communication are scheduled by different cells, wherein resolving the scheduling order further comprises:
enabling the scheduling order.

11. The method of claim 10, further comprising:
transmitting an indication that the UE supports scheduling order to a base station, wherein resolving the scheduling order is further based at least in part on transmitting the indication.

12. The method of claim 10, further comprising:
receiving a configuration that indicates the UE is to support scheduling order, wherein resolving the scheduling order is further based at least in part on receiving the configuration.

13. A method for wireless communication at a user equipment (UE), comprising:
identifying that the UE is in carrier aggregation communication with a first cell having a first sub-carrier spacing and a second cell having a second sub-carrier spacing different than the first sub-carrier spacing;
monitoring one or more UE-specific search spaces of the first cell for first control information scheduling a first data communication on the first cell and one or more UE-specific search spaces of the first cell or the second cell for second control information scheduling a second data communication on the first cell;
resolving a scheduling order of the first control information scheduling the first data communication and the second control information scheduling the second data communication based at least in part on the monitoring and on a scheduling condition;
determining that the scheduling condition indicates that the UE supports scheduling order; and
determining that the first control information scheduling the first data communication and the second control information scheduling the second data communication are scheduled by the first cell, wherein resolving the scheduling order further comprises:
disabling the scheduling order.

14. A method for wireless communication at a user equipment (UE), comprising:
identifying that the UE is in carrier aggregation communication with a first cell having a first sub-carrier spacing and a second cell having a second sub-carrier spacing different than the first sub-carrier spacing;
monitoring one or more UE-specific search spaces of the first cell for first control information scheduling a first data communication on the first cell and one or more UE-specific search spaces of the first cell or the second cell for second control information scheduling a second data communication on the first cell;
resolving a scheduling order of the first control information scheduling the first data communication and the second control information scheduling the second data communication based at least in part on the monitoring and on a scheduling condition; and
determining an ending symbol of the first control information, wherein the scheduling condition is the ending symbol of the first control information, and resolving the scheduling order is based at least in part on the ending symbol of the first control information.

15. A method for wireless communication at a user equipment (UE), comprising:

identifying that the UE is in carrier aggregation communication with a first cell having a first sub-carrier spacing and a second cell having a second sub-carrier spacing different than the first sub-carrier spacing;
monitoring one or more UE-specific search spaces of the first cell for first control information scheduling a first data communication on the first cell and one or more UE-specific search spaces of the first cell or the second cell for second control information scheduling a second data communication on the first cell;
resolving a scheduling order of the first control information scheduling the first data communication and the second control information scheduling the second data communication based at least in part on the monitoring and on a scheduling condition; and
determining an offset based at least in part on a processing time difference between decoding the first control information and the second control information at the UE, wherein the scheduling condition comprises the offset.

16. The method of claim 15, further comprising:
determining an ending symbol of the second control information, wherein resolving the scheduling order is further based at least in part on the ending symbol of the second control information and the offset.

17. The method of claim 16, wherein the first data communication is received before an end of the second data communication when the first control information ends at least by the ending symbol of the second control information adjusted with the offset.

18. The method of claim 15, further comprising:
determining an ending symbol of the first control information, wherein resolving the scheduling order is further based at least in part on the ending symbol of the first control information and the offset.

19. The method of claim 18, wherein the second data communication is received before an end of the first data communication when the second control information ends at least by the ending symbol of the first control information adjusted with the offset.

20. The method of claim 15, further comprising:
receiving a configuration that identifies the offset from a base station.

21. The method of claim 15, further comprising:
determining the offset based at least in part on a difference between the first sub-carrier spacing and the second sub-carrier spacing.

22. The method of claim 15, further comprising:
determining the offset based at least in part on a number of symbols in the first control information and a number of symbols in the second control information.

23. An apparatus for wireless communication at a user equipment (UE), comprising:
a processor;
memory coupled with the processor; and
instructions stored in the memory and executable by the processor to cause the apparatus to:
identify that the UE is in carrier aggregation communication with a first cell having a first sub-carrier spacing and a second cell having a second sub-carrier spacing different than the first sub-carrier spacing;
monitor one or more UE-specific search spaces of the first cell for first control information scheduling a first data communication on the first cell and one or more UE-specific search spaces of the first cell or the second cell for second control information scheduling a second data communication on the first cell;
resolve a scheduling order of the first control information scheduling the first data communication and the second control information scheduling the second data communication based at least in part on the monitoring and on a scheduling condition; and
determine an ending symbol of the second control information, wherein the scheduling condition comprises the ending symbol of the second control information, and wherein resolving the scheduling order is based at least in part on the ending symbol of the second control information.

24. The apparatus of claim 23, wherein the first cell is a scheduling cell and the second cell is a scheduled cell.

25. The apparatus of claim 23, wherein the first cell and the second cell are scheduling cells.

26. The apparatus of claim 23, wherein the second data communication begins after the ending symbol of the first control information.

27. An apparatus for wireless communication at a user equipment (UE), comprising:
a processor;
memory coupled with the processor; and
instructions stored in the memory and executable by the processor to cause the apparatus to:
identify that the UE is in carrier aggregation communication with a first cell having a first sub-carrier spacing and a second cell having a second sub-carrier spacing different than the first sub-carrier spacing;
monitor one or more UE-specific search spaces of the first cell for first control information scheduling a first data communication on the first cell and one or more UE-specific search spaces of the first cell or the second cell for second control information scheduling a second data communication on the first cell;
resolve a scheduling order of the first control information scheduling the first data communication and the second control information scheduling the second data communication based at least in part on the monitoring and on a scheduling condition,
wherein the scheduling order comprises that the first control information ends at a first symbol and schedules a first data communication that starts at a second symbol and ends in a third symbol and that the second control information ends in a fourth symbol and schedules the second data communication to start before the third symbol, and
the first symbol precedes the second, third, and fourth symbols.

28. An apparatus for wireless communication at a user equipment (UE), comprising:
a processor;
memory coupled with the processor; and
instructions stored in the memory and executable by the processor to cause the apparatus to:
identify that the UE is in carrier aggregation communication with a first cell having a first sub-carrier spacing and a second cell having a second sub-carrier spacing different than the first sub-carrier spacing;
monitor one or more UE-specific search spaces of the first cell for first control information scheduling a first data communication on the first cell and one or more UE-specific search spaces of the first cell or the second cell for second control information scheduling a second data communication on the first cell;
resolve a scheduling order of the first control information scheduling the first data communication and the second control information scheduling the second data communication based at least in part on the monitoring and on a scheduling condition;

determine that the scheduling condition indicates that the UE supports scheduling order; and determine that the first control information scheduling the first data communication and the second control information scheduling the second data communication are scheduled by different cells, wherein resolving the scheduling order further comprises:

enable the scheduling order.

29. An apparatus for wireless communication at a user equipment (UE), comprising:

a processor;

memory coupled with the processor; and instructions stored in the memory and executable by the processor to cause the apparatus to:

identify that the UE is in carrier aggregation communication with a first cell having a first sub-carrier spacing and a second cell having a second sub-carrier spacing different than the first sub-carrier spacing;

monitor one or more UE-specific search spaces of the first cell for first control information scheduling a first data communication on the first cell and one or more UE-specific search spaces of the first cell or the second cell for second control information scheduling a second data communication on the first cell;

resolve a scheduling order of the first control information scheduling the first data communication and the second control information scheduling the second data communication based at least in part on the monitoring and on a scheduling condition;

determine that the scheduling condition indicates that the UE supports scheduling order; and determine that the first control information scheduling the first data communication and the second control information scheduling the second data communication are scheduled by the first cell, wherein resolving the scheduling order further comprises:

disable the scheduling order.

30. A non-transitory computer-readable medium storing code for wireless communication at a user equipment (UE), the code comprising instructions executable by a processor to:

identify that the UE is in carrier aggregation communication with a first cell having a first sub-carrier spacing and a second cell having a second sub-carrier spacing different than the first sub-carrier spacing;

monitor one or more UE-specific search spaces of the first cell for first control information scheduling a first data communication on the first cell and one or more UE-specific search spaces of the first cell or the second cell for second control information scheduling a second data communication on the first cell;

resolve a scheduling order of the first control information scheduling the first data communication and the second control information scheduling the second data communication based at least in part on the monitoring and on a scheduling condition; and determine an ending symbol of the second control information, wherein the scheduling condition comprises the ending symbol of the second control information, and wherein resolving the scheduling order is based at least in part on the ending symbol of the second control information.

* * * * *